(12) United States Patent
Dash

(10) Patent No.: US 8,930,309 B2
(45) Date of Patent: Jan. 6, 2015

(54) INTERVAL-CONTROLLED REPLICATION

(75) Inventor: Prasanta R. Dash, San Jose, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/408,892

(22) Filed: Feb. 29, 2012

(65) Prior Publication Data

US 2013/0226870 A1   Aug. 29, 2013

(51) Int. Cl.
*G06F 17/30* (2006.01)

(52) U.S. Cl.
CPC .................. *G06F 17/30348* (2013.01)
USPC ........................................ 707/611

(58) Field of Classification Search
USPC ........................................ 707/611
See application file for complete search history.

(56) References Cited

U.S. PATENT DOCUMENTS

| | | | | |
|---|---|---|---|---|
| 6,976,186 | B1* | 12/2005 | Gardner | 714/4.4 |
| 7,188,125 | B1 | 3/2007 | Karr | 707/204 |
| 7,359,927 | B1* | 4/2008 | Cardente | 1/1 |
| 7,467,265 | B1* | 12/2008 | Tawri et al. | 711/161 |
| 7,885,923 | B1 | 2/2011 | Tawri et al. | 707/610 |
| 7,921,262 | B1 | 4/2011 | Dash et al. | 711/154 |
| 2007/0022144 | A1* | 1/2007 | Chen | 707/204 |
| 2008/0244195 | A1 | 10/2008 | Sistla et al. | 711/147 |
| 2011/0016470 | A1 | 1/2011 | Cain, III et al. | 718/101 |

OTHER PUBLICATIONS

Li et al., A Time Interval Based Consistency Control Algorithm for Interactive Groupware Applications, ICPADS '04.*
Hitachi Data Systems Corporation, Solutions Brief, "Synchronous Data Replication," 2007; 8 pages.
Oracle, "Solaris Cluster System Administration Guide," Part No. 821 1257-10; Sep. 2010, Revision A; 396 pages.
Read, Tim, Sun N1 Availability Engineering, Sun BluePrints On-Line, Architecting Availability and Disaster Recovery Solutions, Part No. 817,5783-11; Revision Apr. 2007; 42 pages.
Satish, Sourabh and Brian Hernacki "Method and Apparatus for Extending Functionality of an Operating System;" U.S. Appl. No. 11/477,502, filed Jun. 29, 2006; consisting of Specification, Claims and Abstract (14 pages); and Drawings (3 sheets).
Symantec, "Veritas TM Cluster Server HA/DR Fire Drill—Technology Overview of Automated Disaster Recovery Testing," White Paper: High Availability/Disaster Recovery; 2007; 14 pages.
Warden, Tim, "Storage Virtualization | FAQs & Discussions—DR and Asynchronous Replication—Tutorial and Best Practices," 2003-2011 Las Solanas Consulting; 11 pages.

* cited by examiner

*Primary Examiner* — William Spieler
(74) *Attorney, Agent, or Firm* — Campbell Stephenson LLP

(57) ABSTRACT

Various systems and methods for interval-controlled replication are described. For example, one method involves a node receiving a first interval indication indicating start of a first interval. After receiving the first interval indication, an application on the node initiates a first write, which includes the node initiating a first local write and a first remote write. The first local write accesses a local storage. The first remote write accesses a remote storage and replicates the first local write. The node waits for acknowledgements indicating that the local and remote writes have finished, as well as for a second interval indication, before the first write from the application is treated being complete.

21 Claims, 18 Drawing Sheets

INTERVAL-CONTROLLED REPLICATION

BACKGROUND OF THE INVENTION

1. Field of the Invention

This application relates to replication. Particularly, this application relates to managing replication in a distributed environment.

2. Description of the Related Art

Companies today extensively rely on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication is one technique utilized to minimize data loss and improve the availability of data in which a replicated copy of data is distributed and stored at one or more remote sites or nodes. For example, when performing site migration, physical disks storing data or a node associated with such disk(s) may fail. In such a failure event, to ensure data integrity and availability, the remote replicated data copy may be utilized. Replication is frequently coupled with other high-availability techniques, such as clustering, to provide a robust data storage solution.

BRIEF DESCRIPTION OF THE DRAWINGS

The embodiments of the present application may be better understood, and its numerous objects, features, and advantages made apparent to those skilled in the art by referencing the accompanying drawings.

Figure 1:
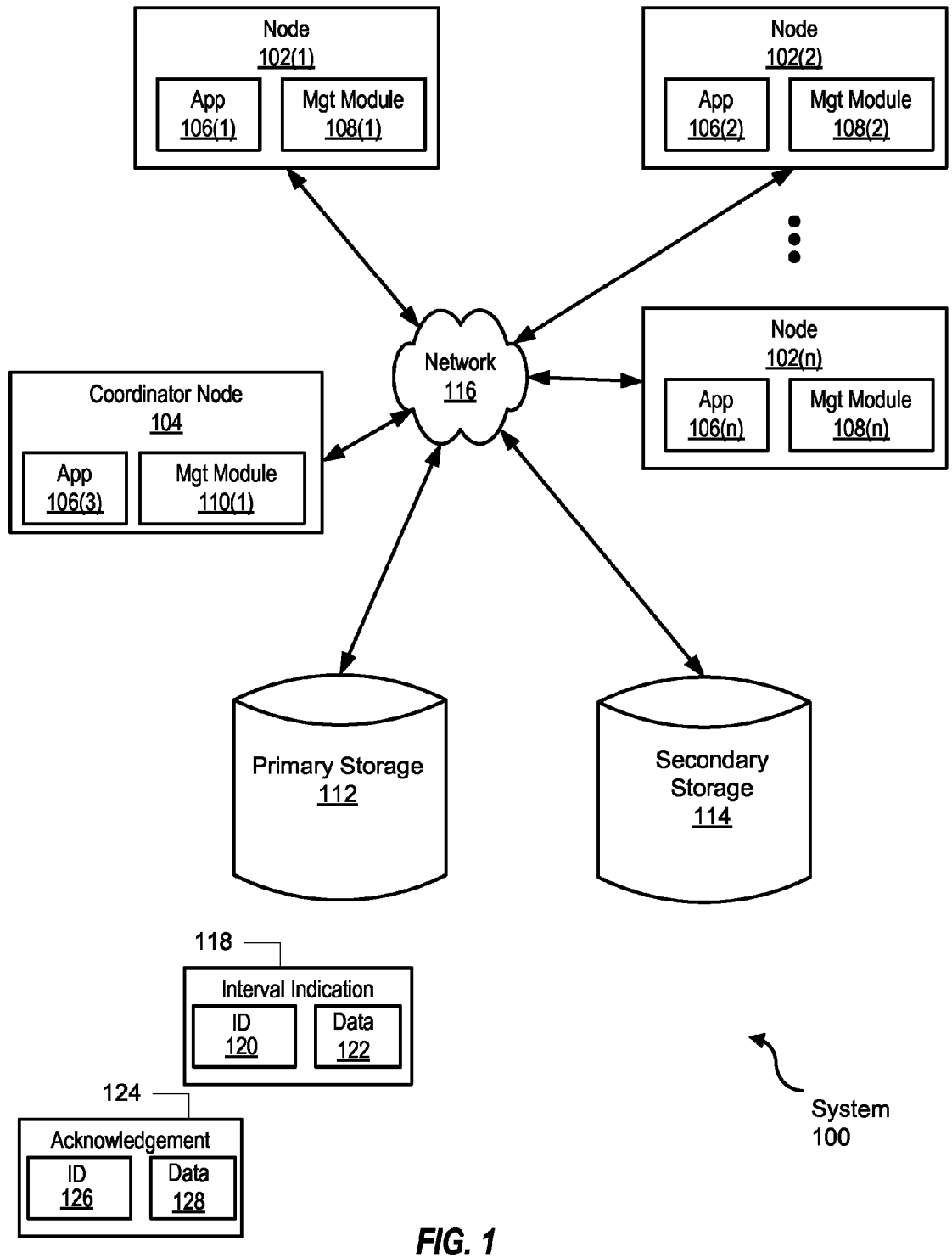
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Modern distributed storage environments may include multiple storage objects connected via one or more interconnection networks. The interconnection networks provide the infrastructure to connect the various elements of a distributed shared storage environment. Storage systems frequently use data redundancy mechanisms to ensure data integrity, consistency, and availability. Other uses for data redundancy may include backing up data, distributed load sharing, disaster recovery, or point-in-time analysis and reporting. One approach to data redundancy is to copy or replicate data from a primary storage system to a second or replicated storage system. In other words, a storage system may duplicate data written to the primary copy of a data block to redundant or replicated copies of that data block in other, secondary storage systems. In some designs this copying is done synchronously when the data I/O is preformed. In other designs this replication may be performed asynchronously with the second storage system's data state lagging the primary storage state by a time interval that can be anywhere from fractions of a second to many hours, depending on the design objectives and technologies used. Periodic replication can also be used, where writes to the second storage system are accumulated and written in batches, e.g., at every period.

FIG. 1 is a block diagram illustrating a distributed system 100 that includes a collection of nodes and storage. Distributed system 100, e.g., a cluster, includes several nodes, e.g., nodes 102(1), 102(2)-102(n) and a coordinator node 104. Each node can communicate with primary storage, e.g., storage 112, using a network, e.g., network 116. Furthermore, each node can communicate with a secondary storage, e.g., storage 114, using a network, e.g., network 116. Network 116 can include a local area network (LAN), a wide area network (WAN), a storage area network (SAN), Ethernet, and/or any combination thereof. It is noted that distributed system 100 may include a different number of nodes.

Each node 102(1)-102(n) can include one or more of applications 106(1)-106(n) and one or more of management modules 108(1)-108(n). Similarly, coordinator node 104 can include application 106(3) and management module 110. Each such application 106(1)-106(n) can originate reads and writes to and from storage. For example, application 106(1) can originate a write to primary storage 112. Node 102(1) can then perform this write to primary storage 112. This write can also be replicated to secondary storage 114, such as by using a management module 106(1). Management module 106(1) can perform replication and other service(s) for node 102(1), as well as for other node(s) in distributed system 100. In one embodiment, it is assumed that when each application issues a write to certain data, that application does not write to this data (or to dependent data) until the first-in-time write is completed. In one embodiment, a management module associated with an application acknowledges to that application that such first-in-time write is complete. Upon receiving this acknowledgement from its associated management module, the application can then issue the dependent write. In one embodiment, a management module can be associated with application on that resides on the same node, e.g., management module 108(1) is associated with application 108(1) on node 102(1). However, in other embodiments, other associations between management modules and applications are contemplated.

Interval-controlled replication, as described herein, may be implemented on distributed or clustered computing environments, such as the one illustrated in FIG. 1. As shown in FIG. 1, a set of source nodes, such as nodes 102(1)-102(n) may write data to one or more primary storage devices, such as primary storage 112 and may also replicate the data writes to a replication target, such as secondary storage 114. The system illustrated in FIG. 1 may implement interval-controlled replication, as described herein. Interval-controlled replication, in some embodiments, involves a node, such as coordinator node 104, sending interval indications to other nodes in distributed system 100. These other nodes, e.g., nodes 102 (1)-102(n) perform write(s) to primary storage 112 and secondary storage 114 in the manner described herein. Each data write from a node, such as from node 102(1), may include an identifier of a current interval. The interval-controlled replication can be used with at least three replication modes, i.e., synchronous replication, asynchronous replication, and periodic replication, as described herein.

Synchronous replication typically ensures that a remote copy of the data is created at the time the primary copy is updated. The remote copy can be created to be substantially similar to the primary copy. In synchronous replication, an I/O operation is not considered done until completion is confirmed at both primary storage 112 and secondary storage 114 (e.g., mirrored site(s)). In one embodiment, an incomplete operation can be retried and/or rolled back at both locations by the application and/or the management module, so as to ensure that the remote copy is (substantially) a mirror image of the primary. During replication, a remote copy of the data is created at the time the primary copy is updated.

For example, if node 102(1) writes to a first data object using both primary storage 112 and secondary storage 114, then use of interval-controlled replication ensures that writes that start in an interval do not complete in the same interval. In addition, node 102(1) or node 102(2) do not issue any writes to either this first data object, or to a second data object that is dependent on the first write, until node 102(1) completes its (first) writes to both object primary storage 112 and secondary storage 114. This ensures that, when using interval-controlled replication, no dependent I/O is written by the same or another node within the same interval as the original I/O write. Interval-controlled replication applies to nodes writing data to both primary storage 112 and to secondary storage 114. A node implementing interval-controlled replication that received I/O in interval m will not complete this I/O until nodes (e.g., all nodes of a certain subset) have moved to the interval (m+1). In some embodiments, a node has "moved" to the next interval when it acknowledges this next interval. Various implementations of such acknowledgements are described in the following figures. Depending on the implementation, it is assumed that node(s) moved to the interval (m+1) when the node(s) started the interval (m+2). In another implementation, it is assumed that a node has moved to the interval (m+1) when this node has send back messages acknowledging the interval (m+1). In other words, for a given node, I/Os on any node that were received in interval m are independent of each other because no other node can complete any of these I/Os until interval m+1.

In one embodiment, for synchronous replication, a node waits for an acknowledgement from the primary storage, an acknowledgement from the secondary storage, and an interval indication for a next interval before issuing the next I/O write that is dependent on the previous I/O write. For example, management module 108(1) for node 102(1) waits on an acknowledgement from primary storage 112 regarding a first local write (e.g., having an associated ID for interval m), an acknowledgement from the secondary storage regarding a first remote write (e.g., having an associated ID for interval m), an interval indication for a next interval (e.g., m+1) as well as acknowledgement(s) that the other nodes in distributed system 100 have moved to this next interval (m+1) before acknowledging to application 106(1) that the first I/O write (i.e., the first local write and the first remote write) is complete. Once application 106(1) receives such acknowledgement from its associated management module 108(1), application 106(1) can issue the next I/O write that is dependent on the first I/O write.

In one embodiment, for asynchronous replication, a node waits for an acknowledgement from the primary storage and an interval indication for a next interval before issuing the next I/O write that is dependent on the previous I/O write. In other words, in contrast with the synchronous replication, the node in asynchronous replication does not wait for an acknowledgement from the secondary storage before sending an acknowledgement to the application. For example, management module 108(1) for node 102(1) waits on an acknowledgement from primary storage 112 regarding a first local write (e.g., having an associated ID for interval m) and an interval indication for a next interval (e.g., m+1) as well as acknowledgement(s) that the other nodes in distributed system 100 have moved to this next interval (m+1) before acknowledging to application 106(1) that the first I/O write (i.e., the first local write) is complete. Once application 106 (1) receives such acknowledgement from its associated management module 108(1), application 106(1) can issue the next I/O write that is dependent on the first I/O write. However, at some point, the secondary storage acknowledges the remote write(s). Secondary storage 114 will apply all I/O writes for interval (m) before it applies any I/O writes for next interval (m+1).

In one embodiment, for periodic replication, a node copies data from primary storage to secondary storage at certain periods. For example, data to be replicated can be collected by a node, such as by using a snapshot and/or using another technique. In one embodiment, the node can use a local storage, such as a log and/or a staging area, where remote writes can be accumulated. At the certain time periods, this accumulated data can be written to the secondary storage, such as by using multiple remote writes (e.g., batch writes). The node in periodic replication does not wait for an acknowledgement from the secondary storage before sending an acknowledgement to the application. For example, management module 108(1) for node 102(1) waits on an acknowledgement from primary storage 112 regarding a first local write (e.g., having an associated ID for interval m) and an interval indication for a next interval (e.g., m+1) as well as acknowledgement(s) that the other nodes in distributed system 100 have moved to this next interval (m+1) before acknowledging to application 106 (1) that the first I/O write (i.e., the first local write) is complete. Once application 106(1) receives such acknowledgement from its associated management module 108(1), application 106(1) can issue the next I/O write that is dependent on the first I/O write. As noted, each such I/O write is accumulated, and then written to the secondary at certain periods.

For all three replication types, in one embodiment, each such interval indication can be implemented as interval indication 118 of FIG. 1. Interval indication 118 can include interval ID 120 and data 122, although other implementation(s) are contemplated. Each node can then determine the current interval from the interval ID 120 of each received interval indication 118. For example, a node, such as a coordinator node, sends interval indications, such as starting with interval m. Each node that receives an interval indication performs I/O operations for that interval. The coordinator node can send these intervals on a certain schedule, i.e., at certain intervals. Data 122 of interval indication 118 can also include other information, such as a list of other nodes that responded with acknowledgements to previous interval indications.

The length of these intervals can be dynamically determined for each distributed storage system. In many cases, the remote I/O write latency is the limiting factor, i.e., the elapsed time between a node write to a remote storage and acknowledgement of that write from this remote storage. In one implementation, coordinator node 104 can determine, e.g., by using management module 110(1) the interval length, such as based on historical data and/or analysis. For example, if local I/Os for nodes 110(1)-110(n) take under 1 ms to complete, and remote I/Os for these nodes take, on the average, from 3 ms to 10 ms to complete, then an interval can be set to 5 ms. In this example, for an I/O (e.g., a remote write by node 102(1)) that takes 7 ms, if this I/O write starts in interval m, then it completes in an interval (m+1). When node 102(1) initiates this remote I/O write, nodes 102(1)-102(n) are in interval m. No other node writes to the same data during this interval m. Next, nodes then receive interval indications for interval (m+1). Another node, e.g., node 102(n), will not attempt to write to the same, or dependent, data, until node 102(1) is finished with the remote I/O.

In one embodiment, coordinator node 104 sends interval notifications to node(s) 102(1)-102(n). In response to receiving one of these interval notifications, each node 102(1)-102(n) can also complete I/O operation(s) started in the previous interval. In one embodiment, the interval notifications can indicate start of intervals. In another embodiment, the interval notifications can indicate other time points, such as end of intervals, half-way points of intervals, etc. For example, interval indications 118 can include associated interval numbers in ID 120. The interval numbers can be associated with the interval notifications, such as an interval notification at time 0 can have an interval number of 1, the next interval notification can have an interval number of 2, etc. However, in other implementations, the interval indications can use different method(s) of indicating progression from one interval indication to the next one.

In one embodiment, node 102(1) receives a first interval indication, e.g., from coordinator node 104. The first interval indication indicates a start of a first interval. Upon receiving the first interval indication, node 102(1) can initiate local writes to primary storage 112. At this time, node 102(1) can also initiate remote writes to secondary storage 114. In one embodiment, the remote writes can be performed as part of a replication process, e.g., of replicating some or all of the data written to primary storage. Both the remote write and the local write can include an associated time stamp. This time stamp can indicate the interval number of the interval notification (i.e., indicate the first interval notification). It is noted that each node issues multiple writes during each interval, and these writes are associated with the current interval. However, the replication mode controls how application(s) for node(s) issue dependent write(s).

In one embodiment, node 102(1) can acknowledge that I/O writes from the first interval are completed when nodes 102(1)-102(n) receive and acknowledge the next interval notification (e.g., a second interval notification) assuming that both the local writes and the remote writes have completed. In one embodiment, frequency of such interval can be determined (e.g., by coordinator node 104) such that in most cases the second interval indication is sent to (and also received and acknowledged by) node(s) 102(1)-102(n) before remote storage 114 acknowledges that the remote writes send in the previous interval are finished. This ensures that application I/O completion is not delayed pending next interval indication; in other words, application I/O latency is unchanged even with introduction of interval control. In one embodiment, remote storage 114 can acknowledge that a remote write has completed to any of node(s) 102(1)-102(n) and/or coordinator node 104. In one embodiment, after receiving the second interval indication, any of nodes 102(1)-102(n) will continue to issue additional I/O writes to local storage 112 and remote storage 114. Similarly as described above, nodes 102(1)-102(n) do not acknowledge (e.g., to applications 106(1)-106(n), respectively) that these additional I/O writes are finished until nodes 102(1)-102(n) receive and process a third interval indication and when both these additional local and remote writes have completed.

In one embodiment, coordinator node 104 receives acknowledgement(s) from node(s) 102(1)-102(n). These acknowledgements are sent by node(s) 102(1)-102(n) to acknowledge receipt of interval indication(s). In one embodiment, each such acknowledgement can be implemented as acknowledgement 124 of FIG. 1. Acknowledgement 124 can include interval ID 126 and data 128, although other implementation(s) are contemplated. For example, each node 102(1)-102(n) can send an acknowledgement (e.g., ID 126 of that acknowledgement 124 indicating a first interval) to coordinator node 104 acknowledging receipt of the first interval indication. Coordinator node 104 can then send the next interval indication (e.g., ID 120 of that interval indication 118 indicating a second interval) in response to receiving acknowledgement(s) from nodes 102(1)-102(n), where these acknowledgement(s) indicate receipt of the interval indication indicating the first interval by nodes 102(1)-102(n).

In one embodiment, if one of nodes 102(1)-102(n) does not send such an acknowledgement back, coordinator node 104 can delay sending the next interval indication for a certain time, after which coordinator node 104 would restart sending the next interval indications to nodes 102(1)-102(n) while keeping track of the interval(s) missed by such a delinquent node. Data sent in the next interval can include a list of active and any delinquent node(s). This data may be recorded in the primary and secondary storage. Once the delinquent node starts to responds to interval indications, the delinquent node can process any accumulated and/or in progress writes. In one implementation, such accumulated writes can be all processed using the interval indicating the time when the delinquent node restarted to respond to interval indications.

While interval-controlled replication is described herein mainly in reference to write requests from applications, file systems, volume managers and similar processes to storage devices, in general, interval-controlled replication may be utilized to provide consistent points or snapshots for any type of data stream. For example, interval-controlled replication may provide consistency checkpoints or snapshots across collections of logs, across collections of storage objects, or across sets of message streams in the distributed or clustered environment. Furthermore, the terms "I/O," "access," and/or "write" are used interchangeably herein to refer to data written by a source node to a replication target, such as during interval-controlled replication. The term "application" is used to refer to any processes executing on source nodes and replicating data to a replication target. Thus, "application," as used herein, may refer to a volume manager, file system, database application, storage replicator, or an end-user application, as well as any other processes replicating data.

Figure 2A:
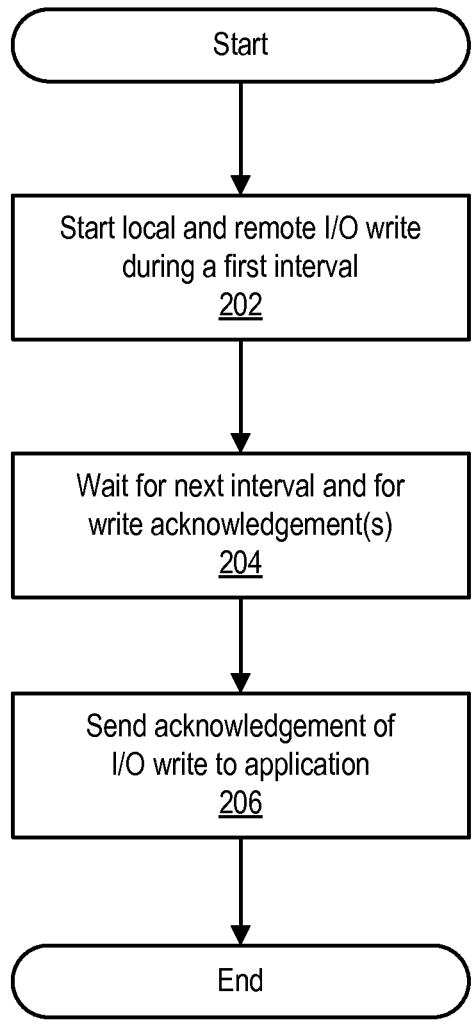
FIGS. 2A-2D are flowcharts illustrating method(s) for operation of a node in interval-controlled replication, according to one or more embodiments.

FIG. 2A is a flowchart illustrating a method 200 for interval-controlled replication, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 200 is described with reference to variations of the elements described in connection with FIG. 1. FIG. 2A illustrates operation of a node, such as node 102(1)-102(N) when operating in the synchronous or asynchronous replication mode. Differences in operation between these two modes are explained, as applicable.

In element 202, a node starts a local and remote I/O write during a first interval. For example, node 102(1) can receive an indication of a first interval (such as from coordinator node 104). Once node 102(1) receives this indication, node 102(1) starts both a local write to primary storage 112, as well as a remote write to secondary storage 114. The remote write can be performed as part of replication, and can be started by node 102(1)'s management module. The local and remote write can be initiated by management module 108(1) as a part of application 106(1) performing an I/O write.

In element 204, when operating in the synchronous replication mode, the node waits for the next interval, an acknowledgement of the remote write from the secondary storage, and an acknowledgement of the local write from the local storage. For example, node 102(1) waits for the acknowledgements from primary storage 112 and secondary storage 114 of the local and remote writes (initiated in element 202), as well as for the next interval indication. In one implementation, node 102(1) can also wait on acknowledgements that other nodes 102(n)-102(n) in distributed system 100 have moved to this next interval.

In element 204, when operating in the asynchronous replication mode, the node waits for the next interval and an acknowledgement of the local write from the local storage. For example, node 102(1) waits for the acknowledgements from primary storage 112 of the local write (initiated in element 202), as well as for the next interval indication. In one implementation, node 102(1) can also wait on acknowledgements that other nodes 102(n)-102(n) in distributed system 100 have moved to this next interval. However, when operating in the asynchronous mode, the node does not wait for an acknowledgement of the remote write from the secondary storage.

In element 206, the node acknowledges to the application that the I/O write is complete. For example, management module 108(1) of node 102(1) sends an acknowledgement to application 106(1) that the I/O write initiated in element 202 is completed. Once application 106(1) receives this acknowledgement, application 106(1) can issue an I/O write that is dependent on the I/O write of element 202.

Figure 2B:
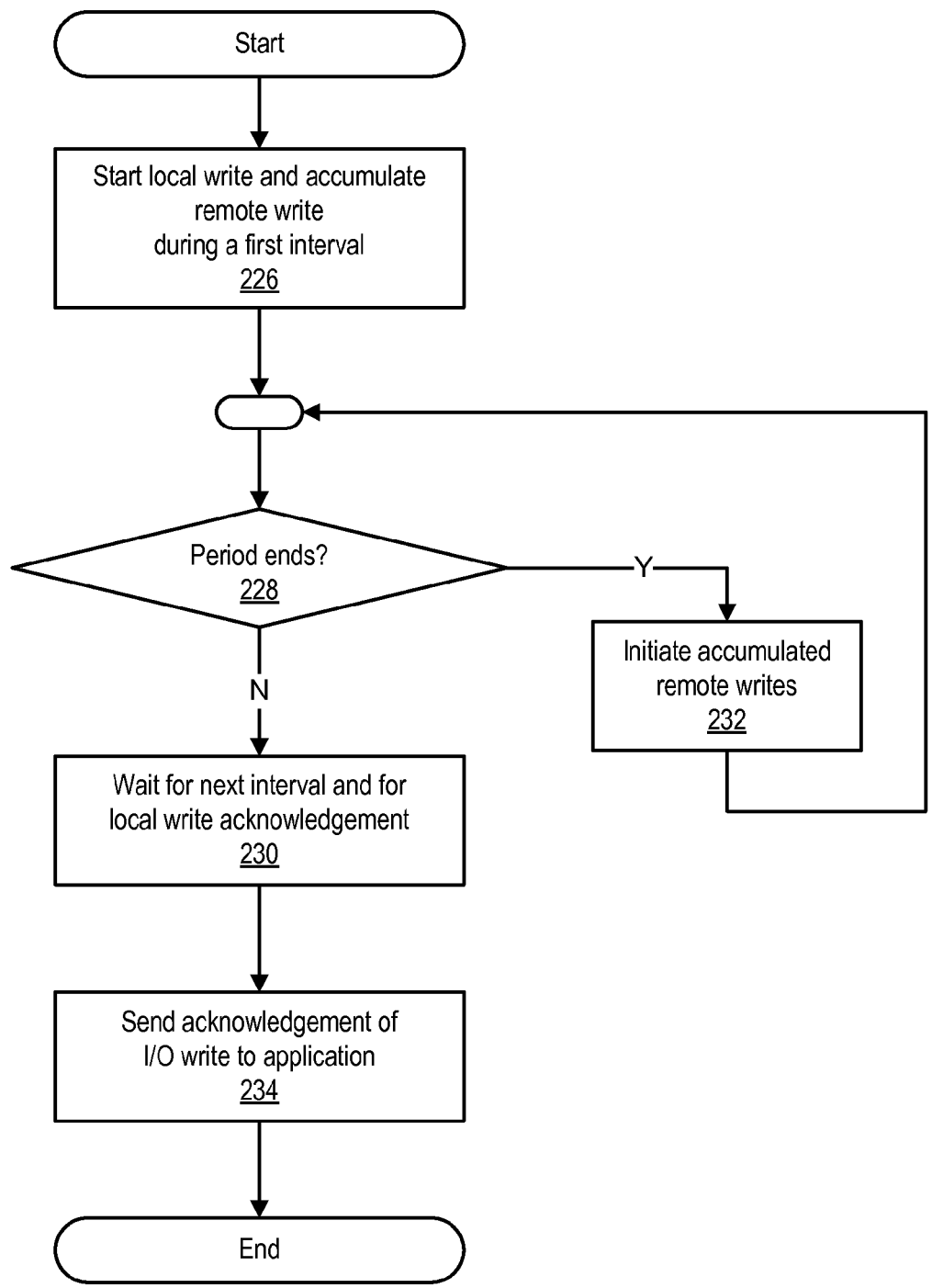

FIG. 2B is a flowchart illustrating a method 225 for the periodic replication mode using interval-controlled replication, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 225 is described with reference to variations of the elements described in connection with FIG. 1. FIG. 2A illustrates operation of a node, such as node 102(1)-102(N) when operating in the periodic replication mode.

In element 226, a node starts a local write and accumulates a remote I/O write during a first interval. For example, node 102(1) can receive an indication of a first interval (such as from coordinator node 104). Once node 102(1) receives this indication, node 102(1) starts both a local write to primary storage 112, as well as accumulates a remote write to secondary storage 114. The remote write can be performed as part of replication, and can be started by node 102(1)'s management module. The local and remote write can be initiated by management module 108(1) as a part of application 106(1) performing an I/O write. Thus, in one embodiment, the node can perform front end logging, where the remote I/O write is collected to a log when the local I/O write is performed. In another embodiment, the node can perform back end logging, where the data is read from the primary storage and then written to a log.

In element 228, the node determines whether the most recent period has ended. In other words, the node determines whether the period in which the most recent remote write (element 226) was initiated has completed. In one embodiment, each node can keep track of its own period(s). In another embodiment, the coordinator node can keep track of periods for the distributed storage system. The coordinator node can, as part of the interval indication (e.g., part of the data field), also send an indication of each period and/or period completions, to the nodes. For example, the interval can be set to 5 ms, and the period can be set to 15 seconds, so each period can include about 3,000 intervals.

In element 230, the node waits for the next interval and an acknowledgement of the local write from the local storage. For example, node 102(1) waits for the acknowledgements from primary storage 112 of the local write (initiated in element 226), as well as for the next interval indication. In one implementation, node 102(1) can also wait on acknowledgements that other nodes 102(n)-102(n) in distributed system 100 have moved to this next interval. However, when operating in the periodic mode, the node does not wait for an acknowledgement of the remote write from the secondary storage.

In element 232, the node initiates accumulated remote I/O writes. For example, management module 108(1) of node 102(1) initiates the accumulated remote I/O writes (e.g., accumulated in the latest period). In one embodiment, the node takes a snapshot of at least a portion of the primary storage to generate the accumulated remote I/O writes. In one embodiment, the I/O writes can be accumulated from the log instead of using the snapshot of application data. The accumulated I/O writes are then written to the secondary storage. In one embodiment, if any I/O writes for interval (m) are included in the period, then all I/O writes for the previous interval (m−1) are also included. After element 232, the node performs element 228.

It is noted that when operating in both the periodic and asynchronous replication modes, the secondary storage still acknowledges remote writes. However, in both cases, node's management module does not wait for these remote write acknowledgements before acknowledging to its associated application that the I/O write is completed. Since the remote I/O writes have associated interval information (e.g., indicating the interval in which that an application write for this remote I/O write was initiated), the secondary storage can apply these remote I/O writes in proper order, i.e., remote writes with an interval of (m) are processed before remote writes with interval of (m+1) are processed. In one embodiment, the secondary storage can queue and process remote I/O writes according to the interval of these writes. By processing the remote writes according to the interval, the secondary storage is consistent, i.e., does not create write conflicts for dependent data.

In one embodiment, the secondary storage can send an acknowledgement when the remote write(s) are received but not yet completed, such as when the remote writes are queued at the secondary storage. In one embodiment, the secondary storage sends an acknowledgement when the remote write is actually written to storage. The secondary storage can also send separate acknowledgements for storing, but not completed, and another acknowledgement when the secondary write is completed.

In element 234, the node acknowledges to the application that the I/O write is complete. For example, management module 108(1) of node 102(1) sends an acknowledgement to application 106(1) that the I/O write initiated in element 202 is completed. Once application 106(1) receives this acknowledgement, application 106(1) can issue an I/O write that is dependent on the I/O write of element 202.

Figure 2C:
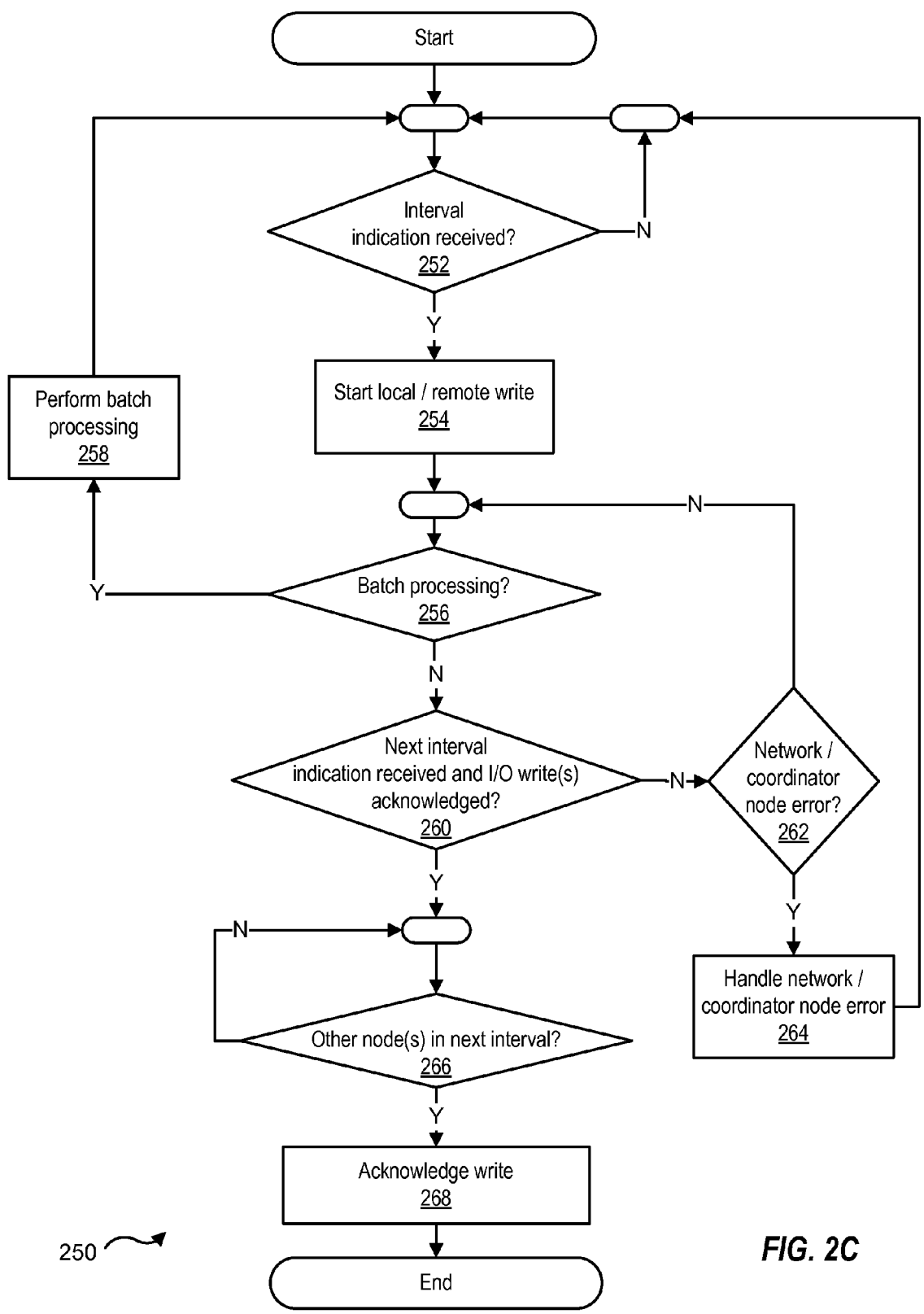

FIG. 2C is another flowchart illustrating a method 250 for interval-controlled replication, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 250 is described with reference to variations of the elements described in connection with FIG. 1. Method 250 is a variation of method 200 described above with reference to FIG. 2A. FIG. 2C illustrates operation of a node, such as node 102(1)-102(N) when operating in the synchronous or asynchronous replication mode. Differences in operation between these two modes are explained, as applicable.

In element 252, it is determined whether an interval indication is received. For example, node 102(1) determines whether an interval indication is received from coordinator node 104. The received interval indication can include an interval ID and data. The interval ID can indicate the current interval. For example, node 102(1) receives an interval indication for interval m.

In element 254, the node can associate I/O writes with the current interval. For example, once node 102(1) receives the interval indication, node 102(1) can associate both local and remote I/O writes with the interval ID of the interval indication. As noted above, remote writes can be performed as part of replication, and can be started by node 102(1)'s management module. The local and remote writes can be initiated by management module 108(1) as a part of application 106(1) performing an I/O write. These two writes can be performed substantially at the same time, as desired.

In element 256, a determination is made whether batch processing can be performed. For example, node 102(1) can be replicating large volumes of data (e.g., from primary storage 112 to remote storage 114). A portion of such replication can be latency sensitive, e.g., when replicating a transaction log. In this case, for select devices, a node may not wait for interval to complete before sending back completion acknowledgements (e.g., to coordinator node 104).

Element 258 is performed if it is determined (i.e., in element 256) that batch processing is performed. In one implementation, node 102(1) can perform numerous I/O writes without having received acknowledgements for all of the outstanding writes. For example, if there are 100 data elements to be replicated, these 100 data elements can be written using the same interval ID (e.g., 100). In one embodiment, all such I/O being batched is processed before any other I/O writes in the secondary storage, since these may be dependent I/O in the same interval(s). Management module(s) can also check whether any I/O being issued by a node does not overlap with the I/O being batched.

In element 260, when operating in the synchronous replication mode, if it is determined that node 102(1) is not performing batch processing, the node waits for the next interval and acknowledgement of the remote write from the secondary storage. The node can also wait for an acknowledgement of the local write from the local storage. In one embodiment, element 260 is similar to element 204 of method 200. For example, node 102(1) receives an interval indication for interval (m+1). It is noted that node 102(1) can receive the next interval indication and receive the acknowledgements from local storage 112 and from remote storage 114 in any order.

In element 260, when operating in the asynchronous replication mode, if it is determined that node 102(1) is not performing batch processing, the node waits for the next interval and for an acknowledgement of the local write from the local storage. In one embodiment, element 260 is similar to element 204 of method 200. For example, node 102(1) receives an interval indication for interval (m+1). It is noted that node 102(1) can receive the next interval indication and receive the acknowledgements from local storage 112 in any order. However, when operating in the asynchronous mode, the node does not wait for an acknowledgement of the remote write from the secondary storage.

In element 262, node 102(1) determines whether there is a network and/or coordinator node error. For example, node 102(1) can determine such network and/or coordinator node error if a certain time period has elapsed since the previous interval indication was received by node 102(1). In element 264, node 102(1) can initiate handling of such a network/coordinator node error. For example, node 102(1) can initiate a process where another node (e.g., node 102(2)) becomes the coordinator node for distributed storage system 100. Once the network/coordinator node error is handled, method 250 returns to element 256.

In element 266, node 102(1) determines whether other node(s) in the distributed network are in the next interval. In one embodiment, node 102(1) determines that the other node(s) in the network have moved to the next interval (i.e., (m+1)) if node 102(1) receives an interval indication for interval (m+2). In another embodiment, node 102(1) determines that the other node(s) in the network have moved to the next interval (i.e., interval (m+1)) if node 102(1) receives an interval acknowledgment indication from coordinator node indicating that the other node(s) in the network have moved to the next interval (i.e., interval (m+1)). In yet another embodiment, node 102(1) determines that the other node(s) in the network have moved to the next interval (i.e., interval (m+1)) if node 102(1) receives the next sub-interval indication(s).

In element 268, the node acknowledges to the application that the I/O write is complete. For example, management module 108(1) of node 102(1) sends an acknowledgement to application 106(1) that the I/O write initiated in element 254 is completed. Once application 106(1) receives this acknowledgement, application 106(1) can issue an I/O write that can be dependent on the I/O write of element 254. In other words, for synchronous replication, node 102(1) does not acknowledge that the I/O write (started in element 254) is finished until the conditions of element 260 are met and the other node(s) are in the next interval.

Figure 2D:
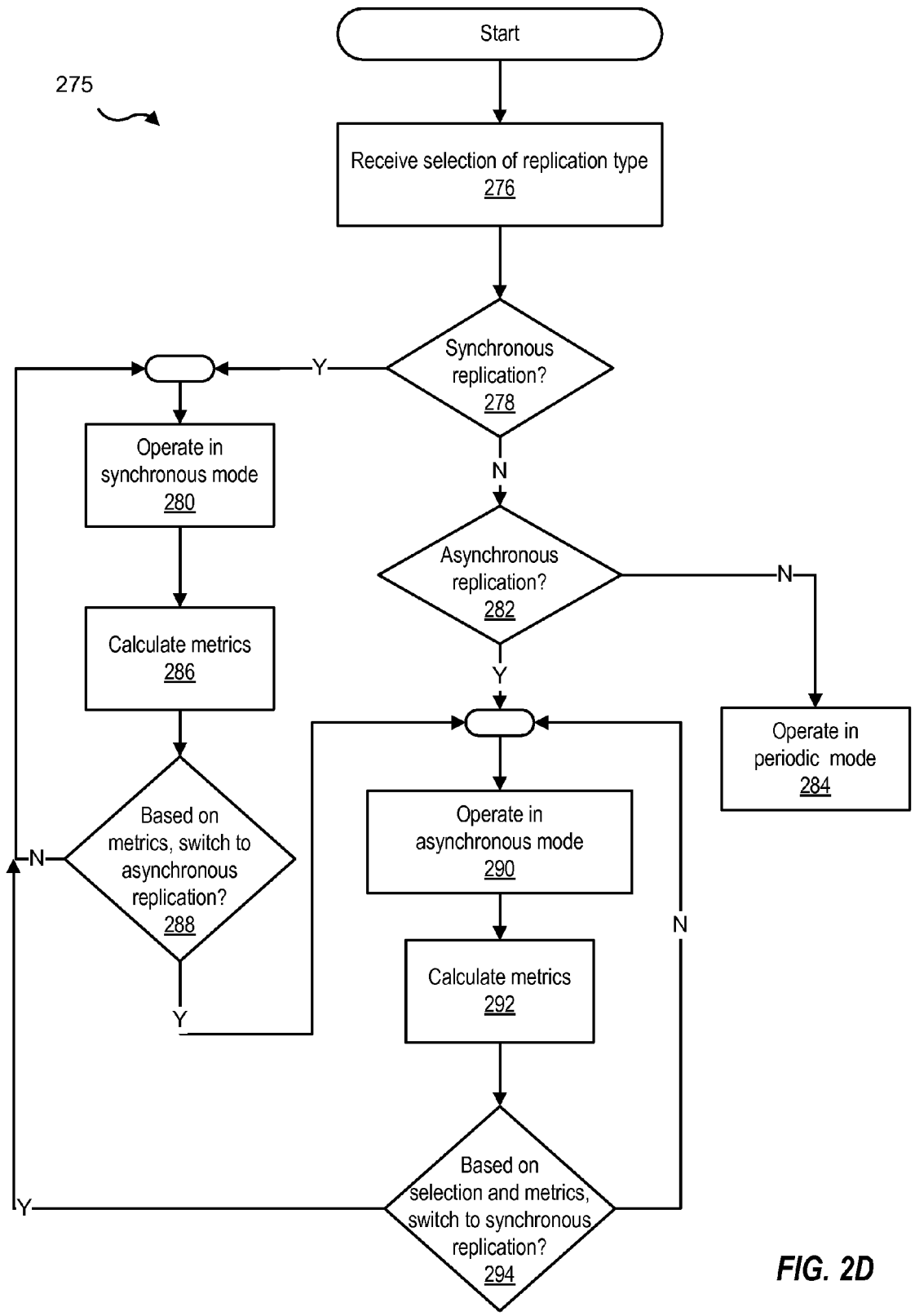

FIG. 2D is another flowchart illustrating a method 275 for interval-controlled replication, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 275 is described with reference to variations of the elements described in connection with FIG. 1. Method 275 can be executed by each node in the distributed storage system to select the type of replication.

In element 276, according to one embodiment, a node can receive a selection of replication type. For example, one or more of node(s) or coordinator node can receive this selection. This selection can be received prior to starting the replication process, or it can be received during replication process. In one embodiment, management modules (including the coordinator node) for all nodes in the distributed system use the same replication mode. Therefore, any replication mode changes are agreed upon between nodes. For example, the coordinator node can send replication mode notifications to the management modules of the other nodes. In one embodiment, the coordinator node can wait on replication mode acknowledgment messages from the other nodes before switching to another replication mode. In one embodiment, element 276 is performed prior to starting replication. In another embodiment, element 276 is performed during replication, such that the replication mode can be changed (e.g., by a user input and/or input from another node/module) dynamically.

In element 278, a determination is made whether the selection indicates synchronous replication. If the selection indicates synchronous replication, then the node operates in synchronous mode (element 280). If the selection does not indicate synchronous replication, then, in element 282, a determination is made whether the selection indicates asynchronous replication. If the selection indicates asynchronous replication, then the node operates in asynchronous mode (element 290). If the selection does not indicate asynchronous replication, then the node operates in periodic mode (element 284).

When operating in the synchronous mode (element 280), the node (and/or the coordinator node) can calculate (element 286) metrics for this node. In element 288, based on these metrics, a determination is made whether to switch to asynchronous replication. In one embodiment, these metrics include whether or not the secondary storage can send acknowledgements of remote writes within a predetermined time period. In one embodiment, these metrics include network statistics, responsiveness of node(s), and/or responsiveness of the secondary storage of the distributed storage system. If the determination indicates that a switch to the asynchronous replication should be made, this node can switch its operation to asynchronous replication (element 290). For example, if the latency of the secondary storage is too large, then the distributed storage system would operate more efficiently in the asynchronous replication mode instead of the synchronous replication mode.

When operating in the asynchronous mode (element 290), the node (and/or the coordinator node) can calculate (element 292) metrics for this node. In element 294, based on these metrics and the original synchronization mode (element 276), a determination is made whether to switch to synchronous replication. In one embodiment, these metrics include whether or not the secondary storage can send acknowledgements of remote writes within a predetermined time period. In one embodiment, these metrics include network statistics, responsiveness of node(s), and/or responsiveness of the secondary storage of the distributed storage system. For example, a metric can indicate that a sufficient number (e.g., all) of outstanding remote writes can be written to the secondary storage; the threshold for the sufficient number of outstanding remote I/O writes being written can be determined dynamically. If the determination indicates that a switch to the synchronous replication should be made, this node can switch its operation to synchronous replication (element 280). For example, the mode can be switched to synchronous if the determination using the metrics indicates that this would be more efficient, and if the original selection was for synchronous mode.

Figure 3:
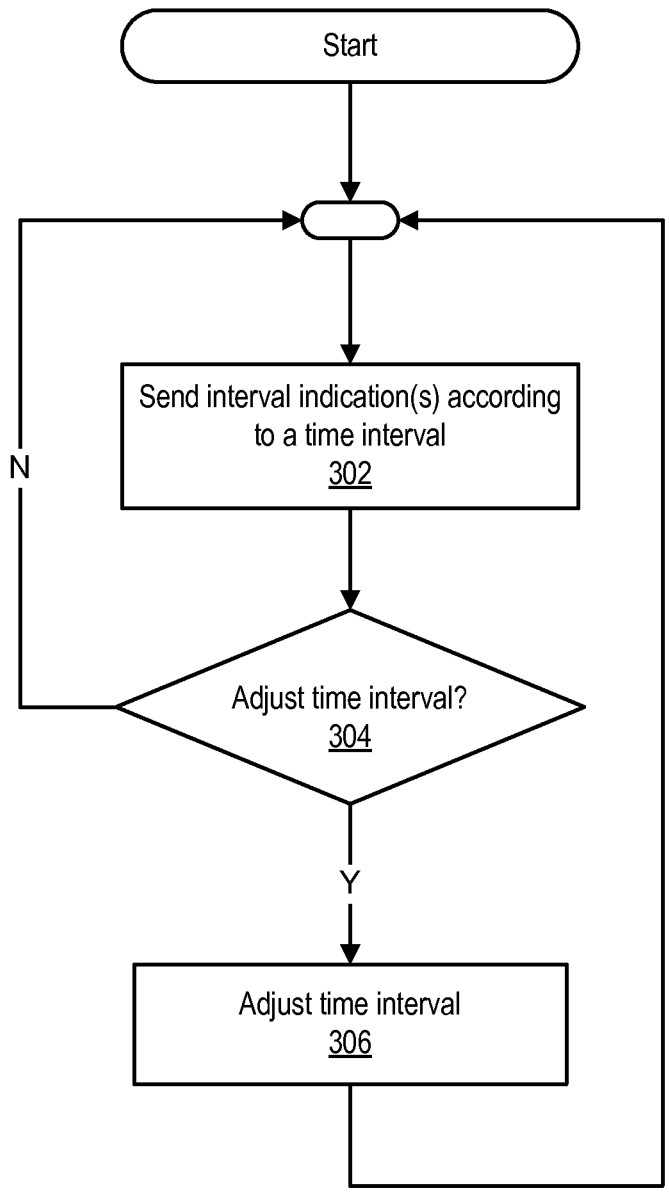
FIG. 3 is a flowchart illustrating a method for operation of a coordinator node in interval-controlled replication, according to one embodiment.

FIG. 3 is a flowchart illustrating a method for operation of a coordinator node in interval-controlled replication, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 300 is described with reference to variations of the elements described in connection with FIG. 1. FIG. 3 illustrates the operation of the coordinator node in synchronous, asynchronous, or periodic replication. In one embodiment, the coordinator node operates substantially similar in these three replication modes, unless noted otherwise. Furthermore, in one embodiment, the application associated with the coordinator module (e.g., application 106(3)) also can issue I/O writes that are replicated using one of the three replication modes described herein. In other words, the coordinator node can operate as one of the other nodes, in addition to operating as the coordinator node. In one embodiment, for a larger storage system that includes secondary site(s), the coordinator node can also send interval information to one or more nodes in the secondary site(s) and/or to peer coordinator node(s) in secondary site(s).

In element 302, a coordinator node sends interval indications according to a time interval. Coordinator node 104 can use a management module 110(1) to keep track of time intervals. For example, coordinator node 104 can send interval indication(s) to nodes 102(1)-102(n) indicating time interval m during a first interval. Similarly, example, coordinator node 104 can send interval indication(s) to nodes 102(1)-102(n) indicating time interval (m+1) during a second interval.

In one embodiment, when the distributed storage system is operating in periodic replication mode, the coordinator node can, as part of the interval indication (e.g., part of the data field), or in a separate message, also send an indication of each period and/or period completions, to the nodes. For example, the coordinator node can send period indicators indicating the current period. The coordinator node can also send period change indicators indicating that the next period has started.

In element 304, the coordinator node determines whether the time interval should be adjusted. Such a determination can be made when the time interval is too large or too small. The determination of element 304 can be dynamic, i.e., management module 110(1) can determine, e.g., based on analysis of historical data, that a time interval is too short (or too long). For example, if a remote I/O is both started and completed (e.g., the remote I/O sends an acknowledgement back to the node that initiated this remote I/O) in the same interval, then the interval may be too long. Such analysis may be performed using statistics, and management module 110(1) may use a threshold to determine whether enough remote I/O writes start and complete in the same interval. For example, if only 1% of such remote I/O writes start and complete in the same interval, then management module 110(1) may determine that the interval does not need adjusting. On the other hand, if 90% of such remote I/O writes start and complete in the same interval, then management module 110(1) may determine that the interval does need adjusting.

In element 306, the coordinator node adjusts the time interval. For example, if management module 110(1) determines that the time interval is too short, management module 110(1) adjusts the time interval to a longer interval, as determined Similarly, if management module 110(1) determines that the time interval is too long, management module 110(1) adjusts the time interval to a shorter interval, as determined.

FIGS. 4-7 illustrate general timing diagrams of various embodiments of interval-controlled replication. FIGS. 4-7 are described with reference to variations of the elements described in connection with FIG. 1 as well as methods of flowcharts depicted in FIGS. 2A-2D and 3, among others. Node 1 can be implemented by node 102(1), and node 2 can be implemented by node 102(2). For simplicity of illustration, it is assumed that both nodes can process message(s) from a coordinator node at substantially the same time, and thus start new interval at substantially the same time. However, there may be a small, but finite, delay and/or skew between the nodes receiving such message(s).

Figure 4A:
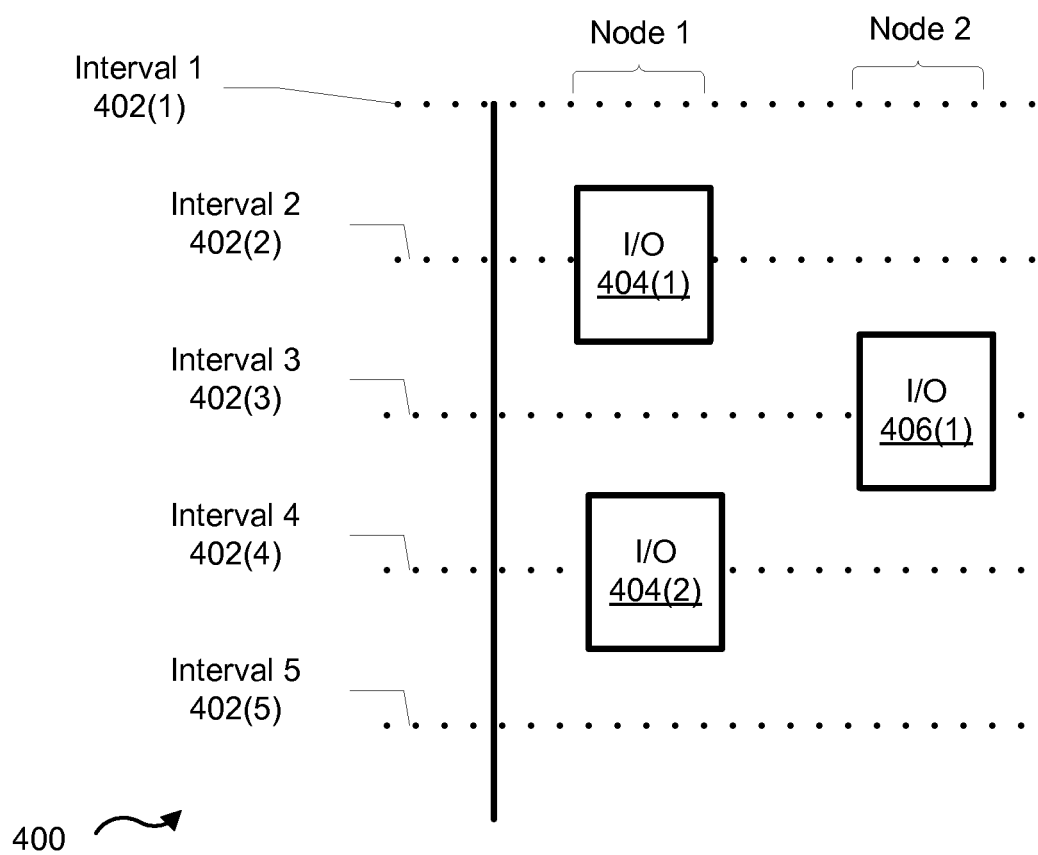
FIGS. 4-7 are diagrams illustrating access by nodes of a distributed storage system, during interval-controlled replication, according to one embodiment.

FIG. 4A is a general timing diagram 400 of I/O writes by two nodes of a distributed storage system that implements the interval-controlled replication, according to one embodiment. A coordinator node (e.g., coordinator node 104) can send interval indications to nodes 1 and 2 that indicate intervals 1-5 402(1)-402(5). Specifically, interval 1 starts at 402(1) and ends at 402(2), interval 2 starts at 402(2) and ends at 402(3), etc. FIG. 4A illustrates the operation of nodes in synchronous, asynchronous, or periodic replication.

In one embodiment, upon receiving interval indication 1, both nodes 1 and 2 can update their internal data structures (e.g., by using management modules) that interval 1 has started. Node 1 can then start first I/O 404(1). While I/O 404(1) accesses data, no other node can perform I/O write(s) to the overlapping or dependent data. While only one I/O is shown per interval, both nodes could be performing hundreds of independent I/Os in each interval. Node 1 can complete I/O 404(1) once node 1 receives indication of the next interval, e.g., indicating that interval 2 404(2) has started. Node 2 can, upon receiving indication of this next interval, start an I/O write 406(1) that may be dependent on I/O write 404(1).

However, node 1 completes I/O write 404(1) in the second interval. Node 2 does not complete its potentially data dependent I/O write 406(1) until interval 3, upon receiving interval indication for interval 3. Similarly, potentially data dependent I/O write 404(2) by node 1 is not started until the third interval, and it is not completed until the fourth interval. To take into account slight difference in times when node process interval message, I/O completions do not take place until all nodes have received next interval indication. This may require additional message between nodes and/or coordinator node.

Figure 4B:
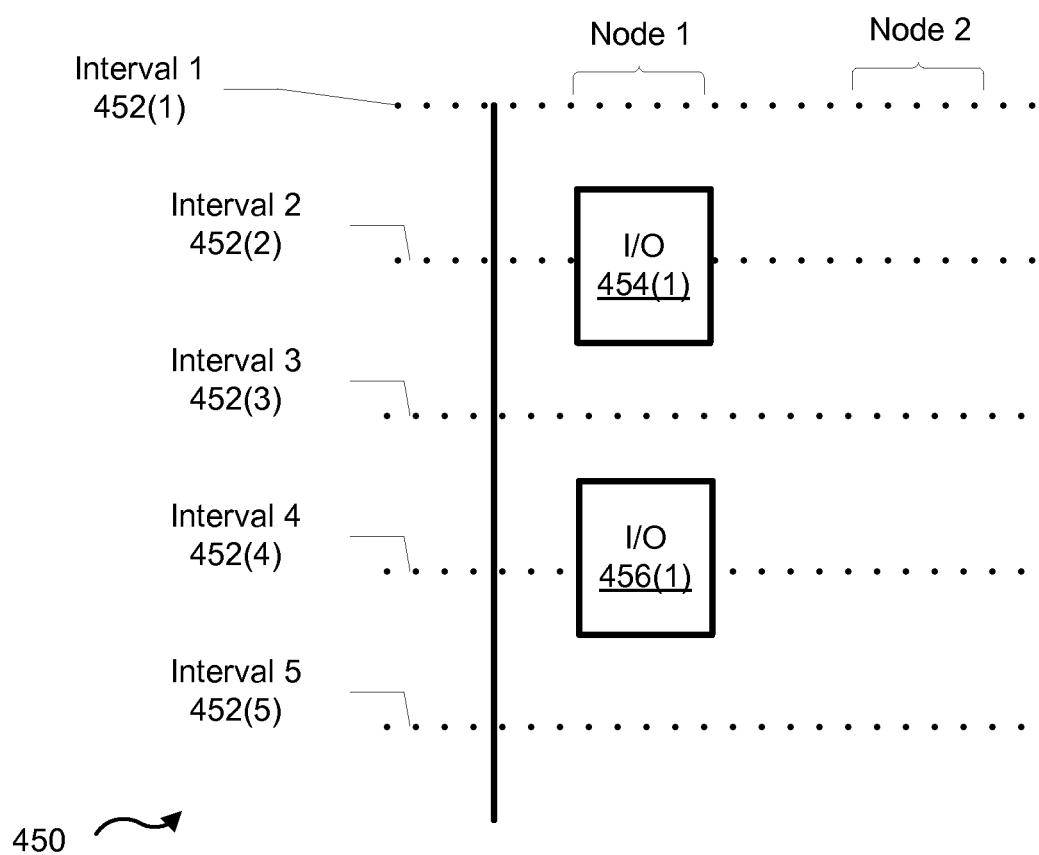

In one embodiment, shown in FIG. 4B, receipt of an interval indication might be taken as an acknowledgement that previous interval is received by all nodes. FIG. 4B is a general timing diagram 450 of I/O writes by two nodes of a distributed storage system that implements the interval-controlled replication, according to one embodiment. A coordinator node (e.g., coordinator node 104) can send interval indications to nodes 1 and 2 that indicate intervals 1-5 502(1)-502(5). FIG. 4B illustrates the operation of nodes in synchronous, asynchronous, or periodic replication.

In the implementation illustrated by FIG. 4B, the management module for node 1 will acknowledge that any I/O writes that started in interval 'in' will be completed in interval 'm+2.' since at that point all nodes have acknowledged receipt of interval 'm+1.' For example, node 1 can initiate I/O write 454(1) in interval 1 (i.e., interval m). This I/O write is not acknowledged (i.e., the management module of node 1 does not acknowledge this I/O write to the application that initiated this write) until node 1 receives interval indication for interval 3 (i.e., interval (m+2). In one embodiment, when a node received a new interval indication such as 'm+1,' this node will use this new interval indication for future I/O writes, even if other nodes have not yet received this new interval indication.

Figure 5:
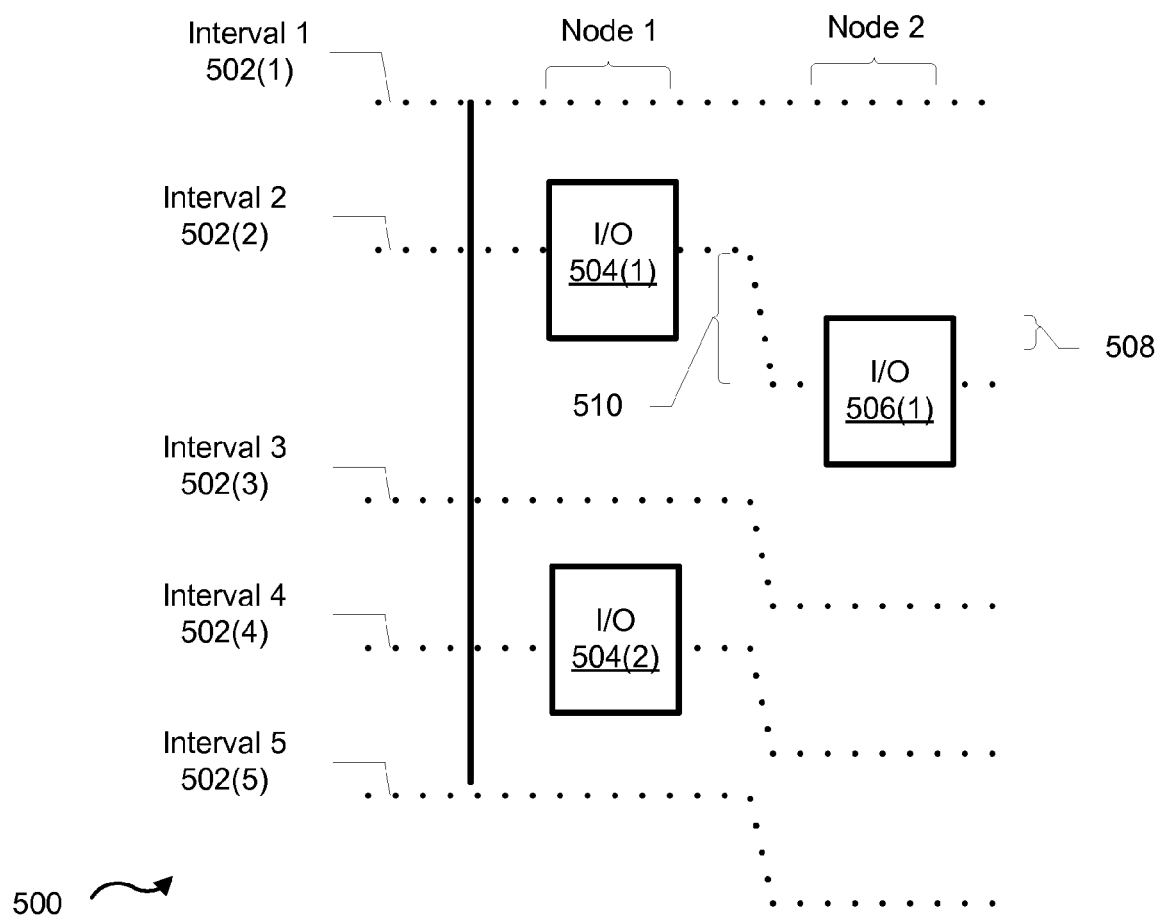

FIG. 5 is a general timing diagram 500 of I/O writes by two nodes of a distributed storage system, according to one embodiment. A coordinator node (e.g., coordinator node 104) can send interval indications to nodes 1 and 2 that indicate intervals 1-5 502(1)-502(5). FIG. 5 illustrates how a delay can create I/O write issues for nodes 1 and 2. FIG. 5 illustrates the operation of nodes in synchronous, asynchronous, or periodic replication.

In one embodiment, upon receiving interval indication 1, both nodes 1 and 2 can update their internal data structures (e.g., by using management modules) that interval 1 has started. Node 1 can then start first I/O 504(1). While I/O 504(1) accesses data, no other node can perform an I/O write to the same data. Node 1 can complete I/O 404(1) once node 1 receives indication of the next interval, e.g., indicating that interval 2 404(2) has started. However, if there is a network or delay issue, then node 2 does not receive an interval indication that interval 2 has started. As a result, node 2 can then start I/O 506(1) that is dependent on node 1's I/O 504(1). This may be problematic, e.g., as I/O write 506(1) is dependent on I/O 504(1) and yet both are performed within the same interval.

Figure 6:
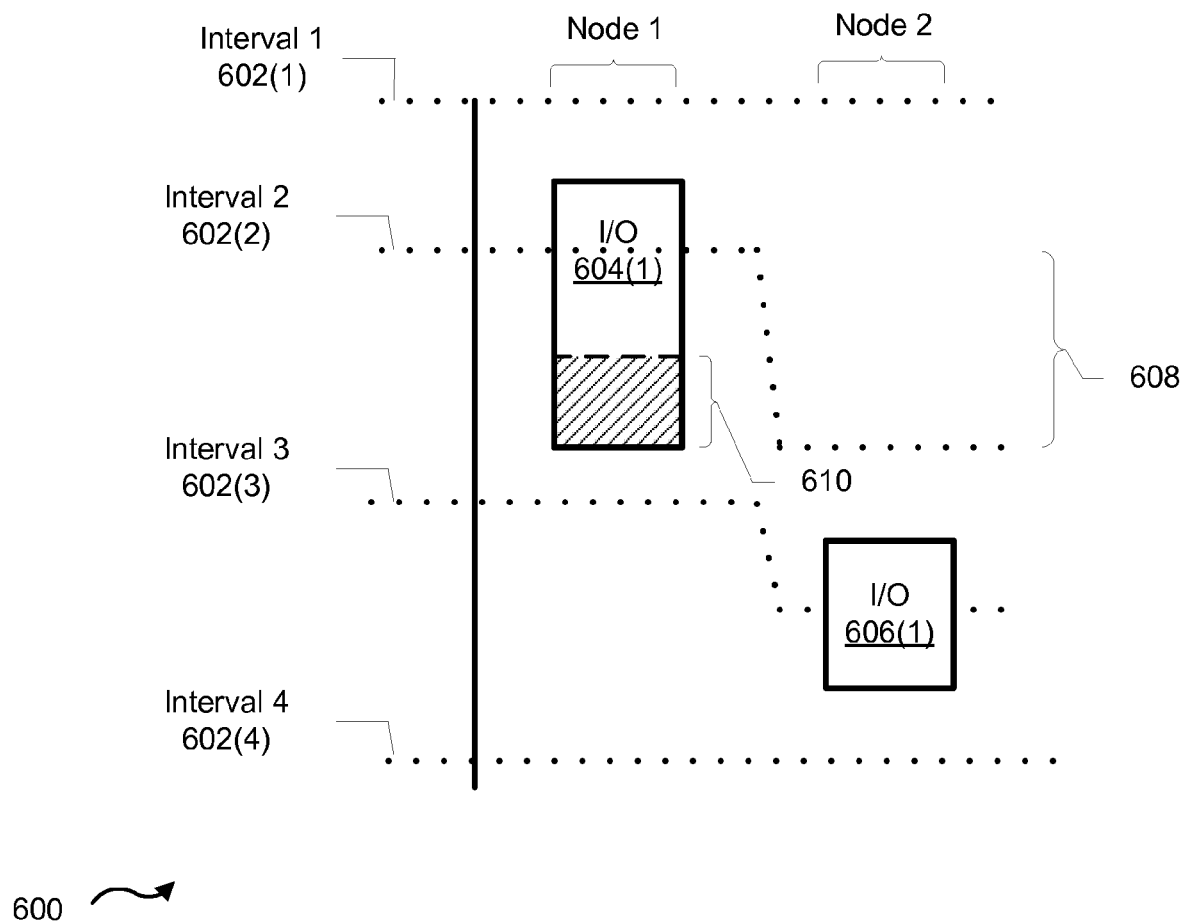

FIG. 6 is a general timing diagram 600 of I/O writes by two nodes of a distributed storage system, according to one embodiment. A coordinator node (e.g., coordinator node 104) can send interval indications to nodes 1 and 2 that indicate intervals 1-4 602(1)-602(4). FIG. 6 illustrates one embodiment of how interval-controlled replication can be used to overcome a possible issue with I/O writes (shown in FIG. 5). FIG. 6 illustrates the operation of nodes in synchronous, asynchronous, or periodic replication.

In one embodiment, upon receiving interval indication 1, both nodes 1 and 2 can update their internal data structures (e.g., used by management module(s)) that interval 1 has started. Node 1 can then start first I/O 604(1). While I/O 604(1) accesses data, no other node can perform an I/O write to the same data. Node 1 can complete I/O 604(1) once node 1 receives indication of the next interval, e.g., indicating that interval 2 604(2) has started. However, if there is a network or delay issue, then node 2 does not receive an interval indication that interval 2 has started. Delay 608 illustrates how long node 2 receives an interval indication of second interval 602(2) after node 1 receives such an indication.

In one embodiment, both node 1 and node 2 can send acknowledgements to the coordinator node indicating receipt of the most recent interval indication. For example, both node 1 and 2 can send interval acknowledgements indicating receipt of interval indication for interval 1 602(1). Upon receipt of interval indication for interval 2 602(2), node 1 can send interval acknowledgement indicating receipt of this interval indication. However, node 2 does not receive this second interval indication (e.g., due to network delay or other issues), until after delay 608. As a result, node 2 does not send an acknowledgement of receiving the second interval indication until after delay 608. In one embodiment, the coordinator node may send additional indicators to indicate when the remaining nodes, including node 2, acknowledge receipt of the second interval indication. Node 1 completes I/O 604(1) after receiving such an additional indication, with I/O 604(1) being delayed an extra amount 610. As a result, dependent I/O write 606(1) by node 2 is not started in the same interval as I/O write 604(1). Furthermore, the coordinator node can then shift and adjust the time of the next interval indicators such that both nodes 1 and 2 receive the next interval indicator at substantially the same time, e.g., for interval 4 602(4).

Figure 7:
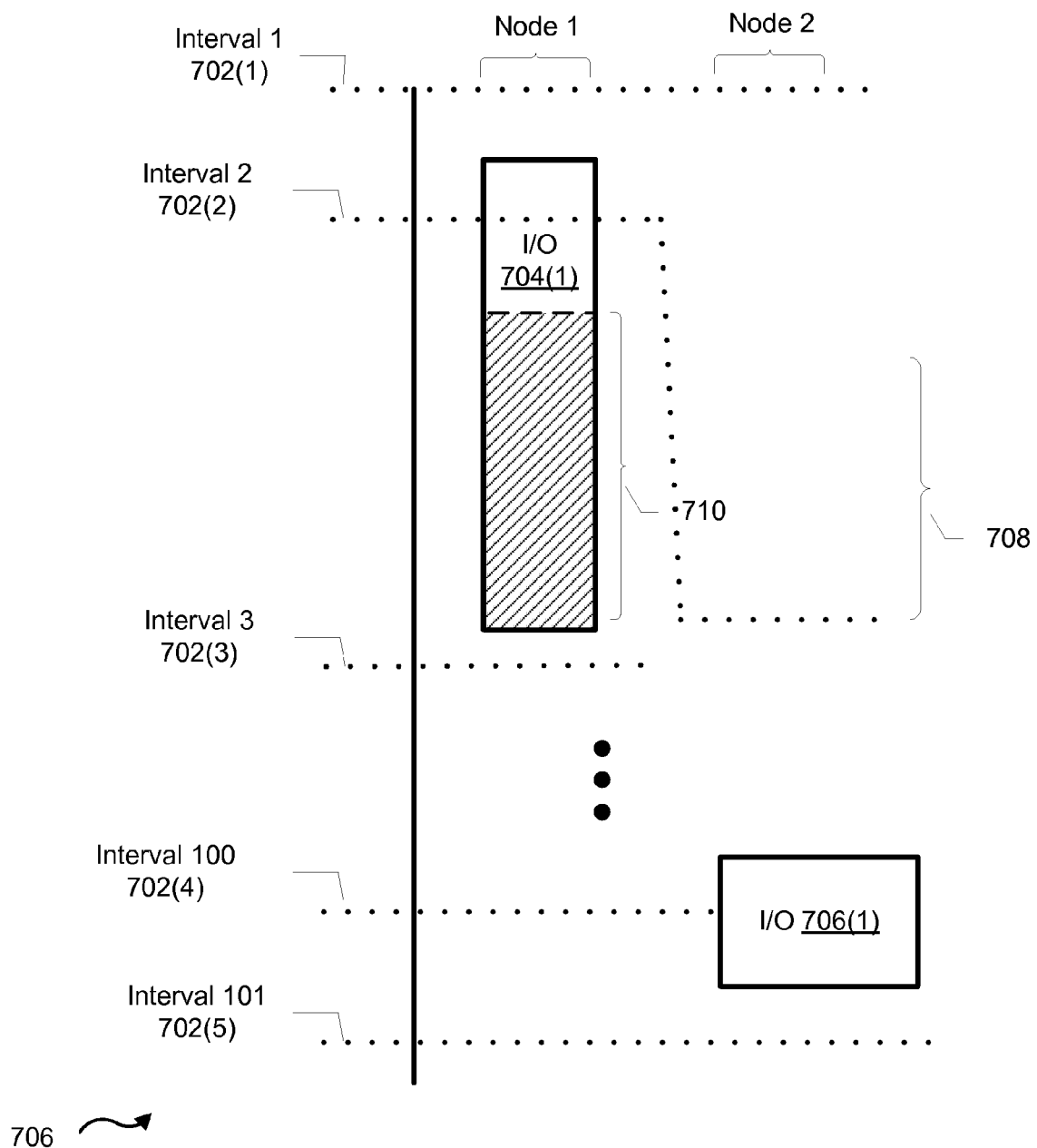

FIG. 7 is a general timing diagram 700 of I/O writes by two nodes of a distributed storage system, according to one embodiment. A coordinator node (e.g., coordinator node 104) can send interval indications to nodes 1 and 2 that indicate intervals 1-5 702(1)-702(5). FIG. 7 illustrates one embodiment of processing of I/O writes when node 2 does not acknowledge interval indications. For example, if there is a network/delay issue, then node 2 does not receive an interval indication that interval 2 has started. Node 2 can also be too busy to acknowledge receipt of the second interval indication. As a result, the coordinator node can delay with sending of the next interval indication for delay 708. FIG. 7 illustrates the operation of nodes in synchronous replication.

After delay 708, the coordinator node can resume sending interval indications to nodes in the distributed system. In one embodiment, the coordinator node can send extra indication messages to nodes indicating which nodes have acknowledged receipt of the interval indication and/or which nodes (i.e., delinquent node(s)) have not acknowledged receipt of the interval indication). In another embodiment, the coordinator node can send partial-interval indication messages to nodes indicating which nodes have acknowledged receipt of the interval indication and/or delinquent node(s). Node 1 can complete I/O write 704(1) after a delay 710, however, the interval may change.

In one embodiment, for synchronous replication, if the delinquent node(s) attempt to initiate writes to the secondary storage, at this point it is not possible to correctly identify/associate interval with any such in-progress I/O writes from the delinquent node(s). As a result, such I/O writes will not be included in the secondary storage until the delinquent node(s) resume acknowledging interval indications from coordinator node. During the time that the delinquent node (e.g., the second node) is not responding to interval indications, the second node could be sending I/O writes to the primary and/or secondary storage, and associating these I/O writes with the interval last known by the second node.

In one embodiment, once the second node re-starts to respond to interval notifications (e.g., to a new interval(s)), the coordinator node can notify the second node about the missed interval range. The second node can then associate any outstanding and in-progress I/O writes as belonging to a new interval (e.g., interval 100) received from the coordinator node. In one embodiment, this can include associating I/O writes that were completed to primary and/or secondary storage writes as belonging to this new interval. In other words, the writes that were processed since the last acknowledged interval till now be treated as if they were received in last received interval. This is acceptable, since the second node could not have acknowledged the application without acknowledging new interval indication to the coordinator node. The second node can also resume I/O writes 706(1).

Figure 8:
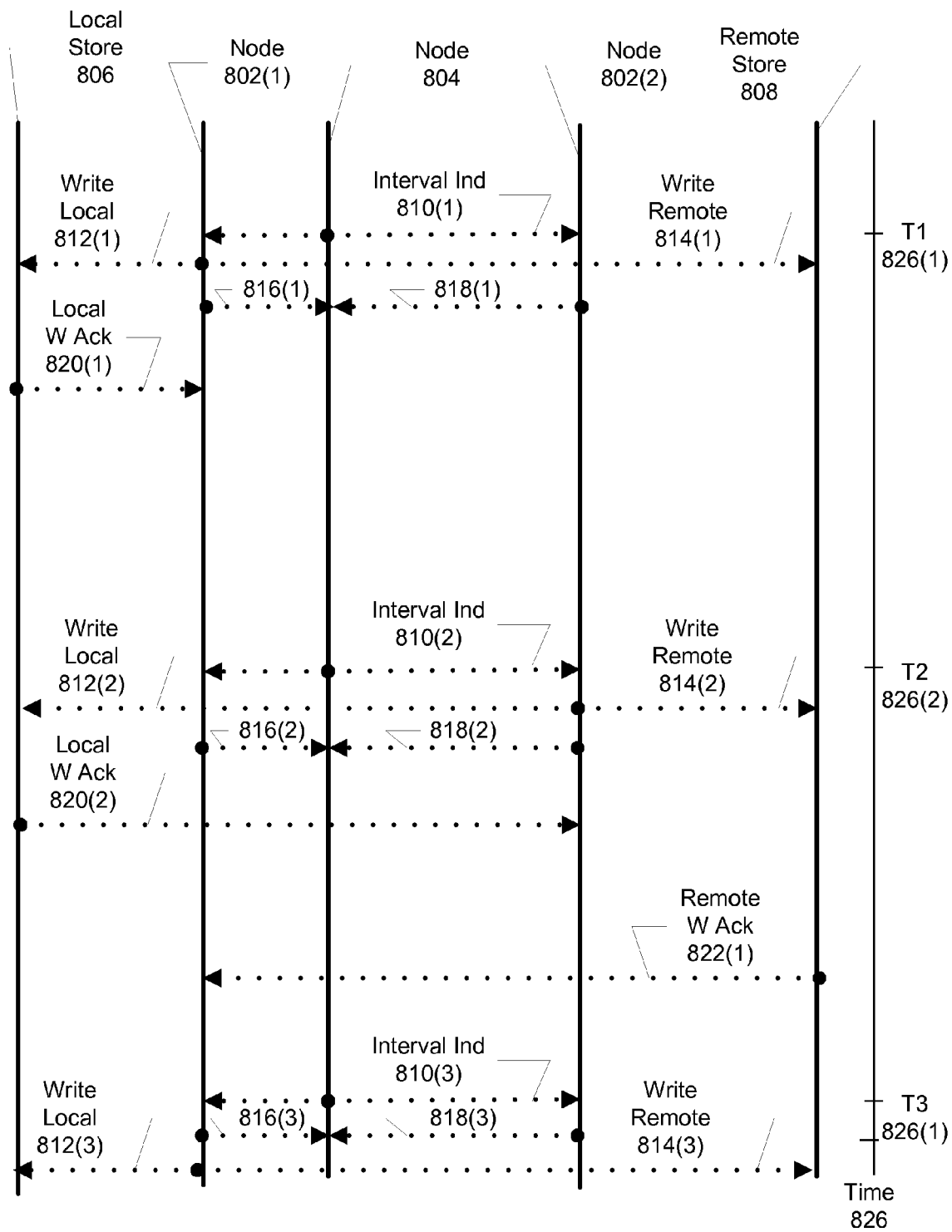
FIGS. 8-10 are diagrams illustrating communication between various nodes and storage devices during interval-controlled replication, according to one embodiment.
Figure 9:
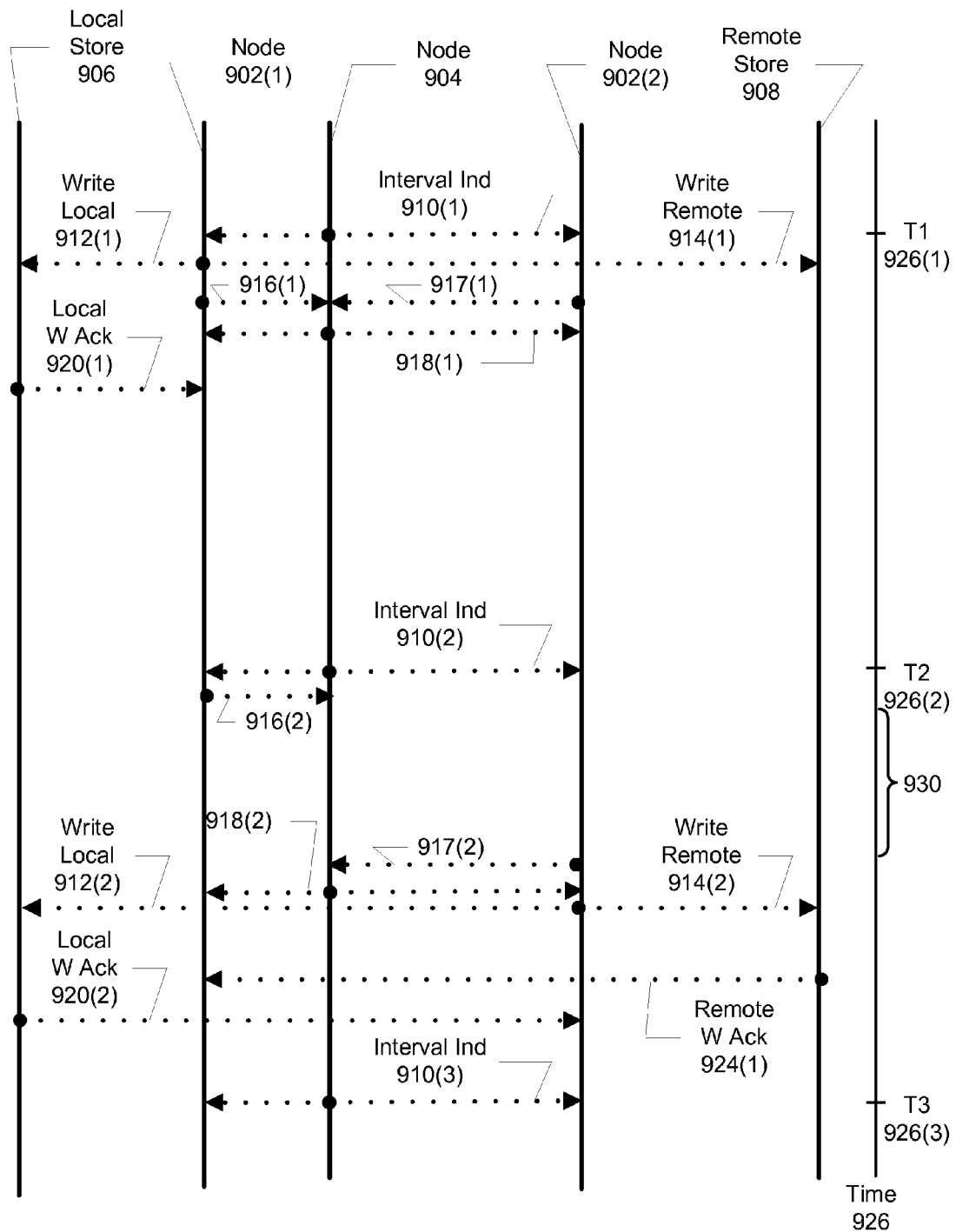
Figure 10:
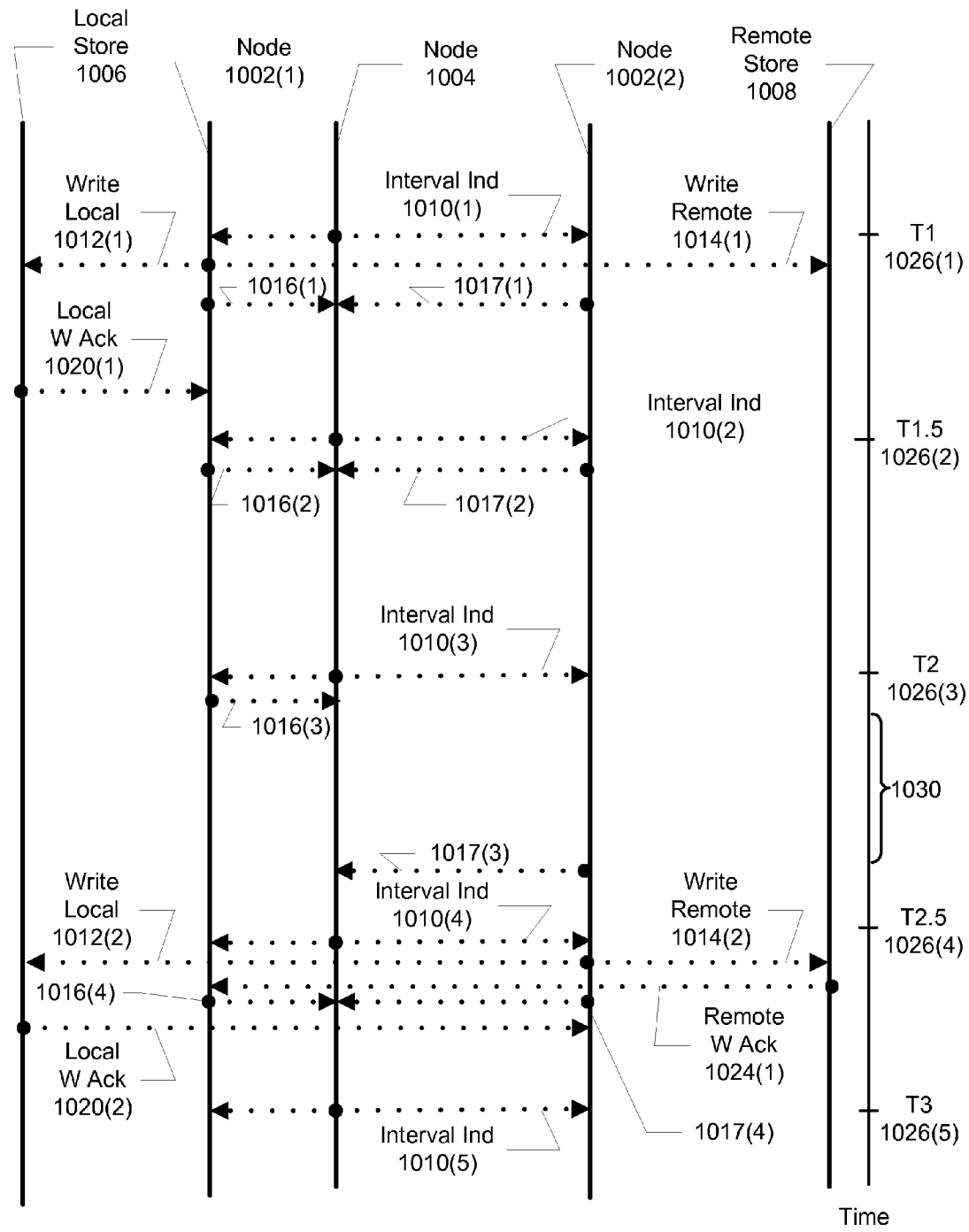

FIGS. 8-10 are diagrams illustrating communication between various nodes and storage devices during interval-controlled replication, according to one embodiment. FIGS. 8-10 are described with reference to variations of the elements described in connection with FIG. 1 as well as methods of flowcharts depicted in FIGS. 2A-2D and 3, among others. In some embodiments, nodes send messages to the coordinator node to acknowledge receipt of an interval indication. In one embodiment, when a node receives interval indication indicating interval (m+2), it is assumed that all nodes that were active (i.e., not delinquent) in interval (m+1) did acknowledge receiving the previous interval to the coordinator node. In one embodiment, the interval indication (e.g., data 122) can indicate whenever active membership changes (e.g., when some node(s) don't acknowledge an interval, or a node that was delinquent earlier, but is active now). In one embodiment, when the interval indication does not include information regarding other nodes, this can indicate that all active nodes acknowledged the previous interval. FIGS. 9-10 illustrate the operation of nodes in the synchronous replication mode, unless noted otherwise. It is noted that FIGS. 8-10 illustrate operation of nodes in the same single replication mode (e.g., all nodes operating in the synchronous replication mode).

FIG. 8 is a timing diagram 800 of communication between various elements of a distributed storage system that implements the interval-controlled replication, according to one embodiment. Element 802(1) illustrates a first node, e.g., node 1 102(1), element 802(2) illustrates a second node, e.g., node 2 102(2), element 804(1) illustrates a coordinator node, e.g., node 104, element 806 illustrates a local storage, e.g., primary storage 112, and element 808 illustrates a remote storage, e.g., secondary storage 114. Element 826 illustrates points in time at which various communications can be initiated. FIG. 8 illustrates the operation of nodes in synchronous, asynchronous, or periodic replication.

At time T1 826(1), coordinator node 804 sends interval indications 810(1) to first node 802(1) and second node 802(2) that indicate a first interval. In both synchronous and asynchronous replication modes, upon receiving interval indication 810(1), and during the first interval, first node 802(1) starts a first I/O write, i.e., both a first local write 812(1) (to local store 806) and a first remote write 814(1) to remote store 808. First remote write 814(1) can include an interval ID indicating the first interval. In periodic replication mode, first node 802(1) can accumulate the first remote write instead. In all three replication modes, and still during the first interval, local store 806 can send local write acknowledgement message(s) 816(1) (acknowledging completion of the first local write) to first node 802(1). First node 802(1) sends interval acknowledgement message 816(1) to coordinator node 804 to acknowledge receipt of first interval indication 810(1). Similarly, second node 802(2) sends interval acknowledgement message 818(1) to coordinator node 804 to acknowledge receipt of first interval indication 810(1).

At time T2 826(2), coordinator node 804 sends interval indications 810(2) to first node 802(1) and second node 802(2) that indicate a second interval. In both synchronous and asynchronous replication modes, and upon receiving interval indication 810(2), and during the second interval, second node 802(2) starts both a second local write 812(2) (to local store 806) and a second remote write 814(2) to remote store 808. In periodic replication mode, second node 802(2) can accumulate the second remote write instead. In all three replication modes, and still during the second interval, local store 806 can send local write acknowledgement message(s) 820 (2) (acknowledging completion of the second local write) to first node 802(1). In synchronous replication, during the second interval, remote store 808 can send remote write acknowledgement message(s) 822(1) (acknowledging completion of the first remote write) to first node 802(1). It is noted that in asynchronous replication, remote store 808 can also send remote write acknowledgement message(s) 822(1), however, management module of first node 802(1) does not wait on receiving this remote write acknowledgement message(s) 822(1) before acknowledging completion of the first write to its associated application.

It is noted that the second I/O write (i.e., second local write 812(2) and second remote write 814(2)) is not dependent on the first I/O write. Second remote write 814(2) can include an interval ID indicating the second interval. Both first and second nodes 802(1) and 802(2) send interval acknowledgement messages 816(2) and 818(2), respectively, to coordinator node 804 to acknowledge receipt of second interval indication 810(2). Remote store 808 can send an acknowledgement once a batch of accumulated remote writes are written (i.e., at the end of a period). In periodic replication, writes are accumulated (in data volume and/or log) for a period and sent to the remote storage after the end of period (i.e., after data for previous periods have been sent).

At time T3 826(3), coordinator node 804 sends interval indications 810(3) to first node 802(1) and second node 802 (2) that indicate a third interval. When operating in synchronous replication, during the third interval, first node 802(1) can acknowledge that the first I/O write is complete, based on receiving acknowledgements from the local and remote store that the first local and remote I/O writes are completed, and that all nodes are in the second interval. When operating in asynchronous and periodic replication, during the third interval, first node 802(1) can acknowledge that the first I/O write is complete, based on receiving acknowledgements from the local store that the first local I/O write is completed, and that all nodes are in the second interval. For example, in all three replication modes, a management node of the first node can acknowledge to an application of the first node that the first I/O write is complete. This application can be requesting to issue the third I/O write. However, since the third I/O write is dependent on the first I/O write (i.e., there is data dependency in the data accessed by these writes), the application waits to issue the third I/O write until it receives the acknowledgement of the first I/O write being completed. Upon receiving interval indication 810(3), and during the third interval, first node 802(1) starts both a third local write 812(2) (to local store 806) and a third remote write 814(2) to remote store 808. Third remote write 814(3) can include an interval ID indicating the third interval.

FIG. 9 is a timing diagram 900 of communication between various elements of a distributed storage system that implements the interval-controlled replication, according to one embodiment. Element 902(1) illustrates a first node, e.g., node 1 102(1), element 902(2) illustrates a second node, e.g., node 2 102(2), element 904(1) illustrates a coordinator node, e.g., node 104, element 906 illustrates a local storage, e.g., primary storage 112, and element 908 illustrates a remote storage, e.g., secondary storage 114. Element 926 illustrates points in time at which various communications can be initiated. FIG. 9 illustrates an embodiment of interval-controlled replication that uses extra indication messages. Nodes (e.g., nodes 902(1) and 902(2)) send messages to coordinator node 904 to acknowledge receipt of an interval indication. In response, coordinator node 904 sends extra indication messages to nodes (e.g., nodes 902(1) and 902(2)) indicating which nodes have acknowledged receipt of the interval indication.

At time T1 926(1), coordinator node 904 sends interval indications 910(1) to first node 902(1) and second node 902 (2) that indicate a first interval. Upon receiving interval indication 910(1), and during the first interval, first node 902(1) starts a first I/O write, i.e., both a first local write 912(1) (to local store 906) and a first remote write 914(1) to remote store 908. First remote write 914(1) can include an interval ID indicating the first interval. First node 902(1) and second node 902(2) also send interval acknowledgements 916(1) and 917(1), respectively, to coordinator node 904, that acknowledge receipt of interval indication 910(1). In response, coordinator node 904 sends interval acknowledgement indication messages 918(1) to nodes 902(1) and 902(2). Interval acknowledgement indication messages 918(1) can indicate which nodes have acknowledged receipt of the interval indication. Still during the first interval, local store 906 can send local write acknowledgement message 920(1), which acknowledges completion of the first local write, to first node 902(1).

At time T2 926(2), coordinator node 904 sends interval indications 910(2) to first node 902(1) and second node 902 (2) that indicate a second interval. First node 902(1) sends interval acknowledgement 916(2) to coordinator node that acknowledges first node's 902(1) receipt of second interval indication 910(2). However, second node 902(2) does not send interval acknowledgement to coordinator node 904 that acknowledges second node's 902(2) receipt of second interval indication 910(2) until after a delay 930. As a result, coordinator node 904 waits (e.g., for at least the duration of delay 930) sending the interval acknowledgement indication messages 918(2) to nodes 902(1) and 902(2) until after second node 902(2) sends interval acknowledgement 917(2) to coordinator node 904. In this example, since the second I/O write is dependent on the first I/O write (i.e., there is data dependency in the data accessed by these writes), second node 902(2) waits to initiate second local write 912(2) and second remote write 914(2) until receiving interval acknowledgement indication message 918(2) from coordinator node 904. Second remote write 914(2) can include an interval ID indicating the second interval.

It is noted that multiple I/O writes can occur between elements 916(2) and 917(2), but are not shown in FIG. 9 for simplicity. For example, after element 916(2), these I/O writes from first node 902(1) use second interval, but on second node 902(2) these I/O writes may use the first or second interval (depending upon whether second node has processed 910(2)). In one embodiment, after element 917(2), second node 902(2) will use second interval even before 918(2) is received.

Still during the second interval, local store 906 can send local write acknowledgement message 920(2) to second node 902(2). During the second interval, remote store 908 can send remote write acknowledgement message 924(1) (acknowledging completion of the first remote write) to first node 902(1). At time T3 926(3), coordinator node 904 sends interval indications 910(3) to nodes 1 and 2 902(1) and 902(2).

FIG. 10 is a timing diagram 1000 of communication between various elements of a distributed storage system that implements the interval-controlled replication, according to one embodiment. Element 1002(1) illustrates a first node, e.g., node 1 102(1), element 1002(2) illustrates a second node, e.g., node 2 102(2), element 1004(1) illustrates a coordinator node, e.g., node 104, element 1006 illustrates a local storage, e.g., primary storage 112, and element 1008 illustrates a remote storage, e.g., secondary storage 114. Element 1026 illustrates points in time at which various communications can be initiated.

FIG. 10 illustrates an embodiment of interval-controlled replication that uses sub-interval indication and acknowledgement messages. In this implementation, instead of sending two messages (interval indication and interval acknowledgement indication), the interval is split into two. At what would have been middle of an interval, a new partial-interval indication message can be sent that also is used as interval acknowledgement indication for the previous interval. With this approach, even though write completion waits for two intervals, effective elapsed duration is still the same as in the implementation of FIG. 9.

Nodes (e.g., nodes 1002(1) and 1002(2)) send messages to coordinator node 1004 to acknowledge receipt of an interval indication. In response, coordinator node 1004 sends the partial-interval indication messages to nodes at partial-interval times (e.g., mid-point of the original interval times) to indicate which nodes have acknowledged receipt of the previous interval indication. In one embodiment, nodes 1002(1) and 1002(2) acknowledge receipt of all interval indications.

At time T1 1026(1), coordinator node 1004 sends interval indications 1010(1) to first node 1002(1) and second node 1002(2) that indicate a first interval. Upon receiving interval indication 1010(1), and during the first interval, first node 1002(1) starts both a first local write 1012(1) (to local store 1006) and a first remote write 1014(1) to remote store 1008. First node 1002(1) and second node 1002(2) also send interval acknowledgements 1016(1) and 1017(1), respectively, to coordinator node 1004, that acknowledge receipt of interval indication 1010(1). Still during the first interval, local store 1006 can send local write acknowledgement message(s) 1020(1), that acknowledge completion of the first local write, to first node 1002(1). In response to receiving interval acknowledgements 1016(1) and 1017(1), coordinator node 1004 sends partial-interval acknowledgement indication messages 1010(2) to nodes 1002(1) and 1002(2) at time T1.5 1026(2), which may be substantially around 0.5 of the interval being used. Each partial-interval acknowledgement indication message also serves as interval acknowledgement indication message and can indicate which nodes have acknowledged receipt of the previous interval indication. In one embodiment, first node 1002(1) and second node 1002(2) also send interval acknowledgements 1016(2) and 1017(2), respectively, to coordinator node 1004, that acknowledge receipt of interval indication 1010(2).

At time T2 1026(3), coordinator node 1004 sends interval indications 1010(2) to first node 1002(1) and second node 1002(2) that indicate a second interval. First node 1002(1) sends interval acknowledgement 1016(3) to coordinator node 1004 that acknowledges first node's 1002(1) receipt of second interval indication 1010(3). However, second node 1002(2) does not send interval acknowledgement to coordinator node 1004 that acknowledges second node's 1002(2) receipt of second interval indication 1010(2) until after a delay 1030. As a result, coordinator node 1004 waits (e.g., for at least the duration of delay 1030) sending the next interval indication 1018(4) to nodes 1002(1) and 1002(2) until after second node 1002(2) sends interval acknowledgement 1017(4) to coordinator node 1004.

In this example, since the second I/O write is dependent on the first I/O write (i.e., there is data dependency in the data accessed by these writes), second node 1002(2) waits to initiate second local write 1012(2) and second remote write 1014(2) until receiving the next interval indication 1018(4) from coordinator node 1004. Second remote write 1014(2) can include an interval ID indicating the second interval. Still during the second interval, local store 1006 can send local write acknowledgement message 1020(2) to second node 1002(2). During the second interval, remote store 1008 can send remote write acknowledgement message 1024(1) (acknowledging completion of the first remote write) to first node 1002(1). At time T3 1026(5), coordinator node 1004 sends interval indications 1010(5) to first and second nodes 1002(1) and 1002(2). In one embodiment, partial intervals can be treated as regular intervals, and as such, an application write that started in the first interval will be acknowledged in the third interval (which ensures that all nodes have moved to second interval). Treating partial intervals as regular intervals can increase interval granularity, i.e., make the intervals smaller, without adding extra messages.

Figure 11:
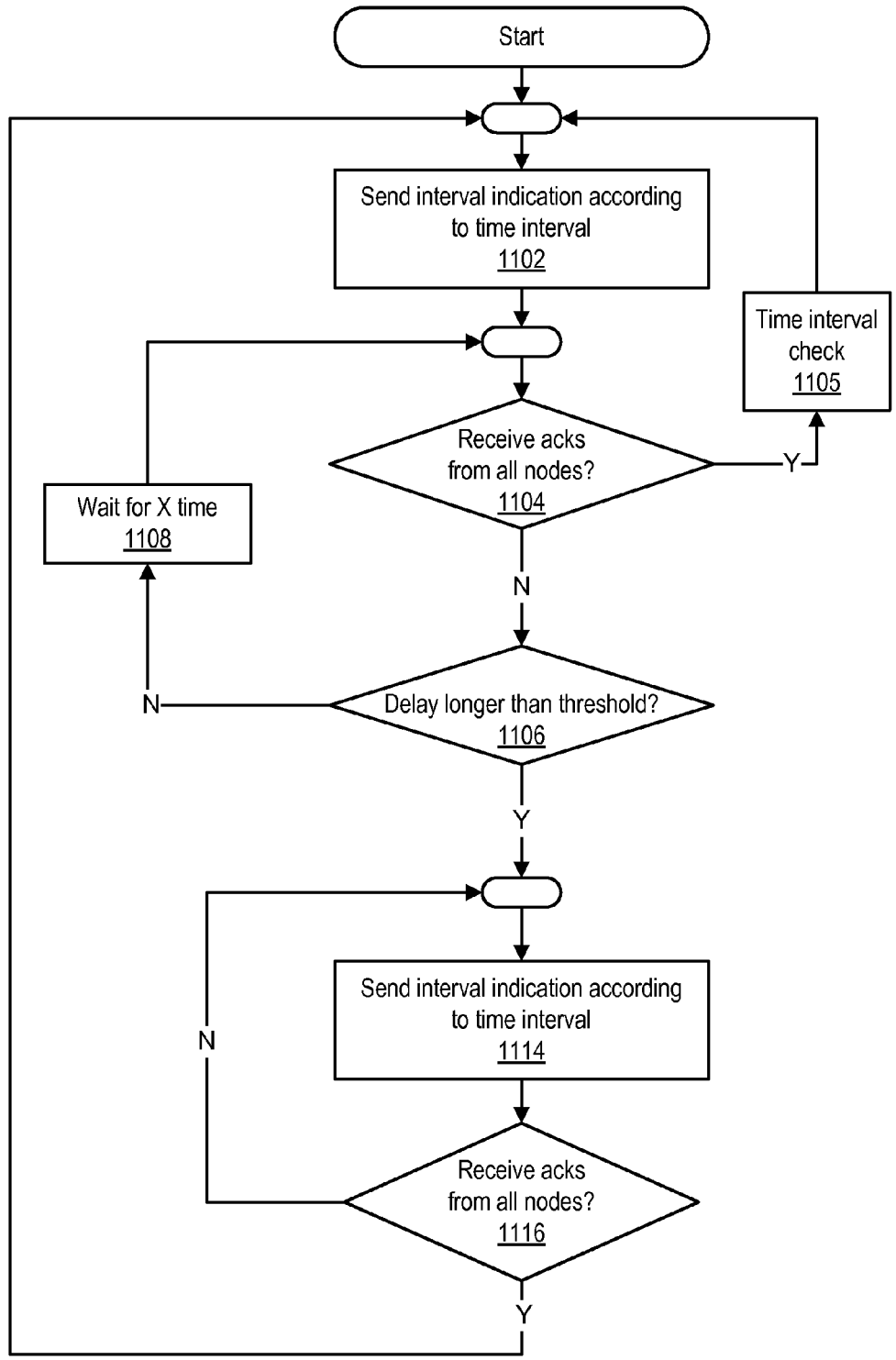
FIG. 11 is a flowchart illustrating a method for operation of a coordinator node in interval-controlled replication, according to one embodiment.

FIG. 11 is a flowchart illustrating a method for operation of a coordinator node in interval-controlled replication, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 1100 is described with reference to variations of the elements described in connection with FIG. 1. Method 1100 is a variation of method 300 described above with reference to FIG. 3. FIG. 11 illustrates the operation of the coordinator node in synchronous, asynchronous, or periodic replication. In one embodiment, the coordinator node operates substantially similar in these three replication modes, unless noted otherwise.

In element 1102, a coordinator node sends interval indications according to a time interval. Coordinator node 104 can use a management module 110(1) to keep track of time intervals. For example, management module can send interval indication(s) to nodes 102(1)-102(n) indicating time interval m during a first interval. Similarly, example, management module can send interval indication(s) to nodes 102(1)-102(n) indicating time interval (m+1) during a second interval.

In element 1104, the coordinator node determines whether acknowledgements (of receiving the previous interval indication) are received from substantially all nodes. In one embodiment, the coordinator node determines whether acknowledgements are received from all nodes in the distributed storage system. In another embodiment, the coordinator node determines whether acknowledgements are received only from an expected subset of nodes in the distributed storage system. The coordinator node can determine which nodes are expected to provide to answer with the acknowledgements. If acknowledgements are received from all of the expected nodes (i.e., either all nodes or the expected subset of nodes) in the distributed I/O system, method 1100 executes element 1105.

In element 1105, a time interval check is performed. In one embodiment, element 1105 includes elements 304 and 306 of method 300. As such, if time interval adjustment is needed, then the time interval is adjusted. If time interval adjustment is not needed, then the time interval is not adjusted. In one embodiment, a delinquent node (i.e., a node that is expected to provide the acknowledgement but does not), responds with such an acknowledgement within the delay threshold specified in element 1106, then element 1105 can shift and/or adjust the time interval accordingly (e.g., a situation described above with reference to FIG. 6). Method 1100 then executes element 1102.

In element 1106, if coordinator node does not receive acknowledgements from the expected nodes, the coordinator node determines whether a delay in receiving these acknowledgements is longer than a threshold. In one embodiment, the value of this threshold can be determined prior to execution of method 1100. In another embodiment, the value of this threshold can be dynamically determined, e.g., during execution of method 1100. For example, the value of this threshold can be computed by the management module(s) analyzing speed of communication between nodes. If the delay is not longer than the threshold, method 1100 performs element 1108, such as where the coordinator module waits for a certain amount of time before executing element 1104 again. Next, method 1100 proceeds to element 1114, where the coordinator node sends the next interval indication using the next time interval.

In one embodiment, in element 1102 and/or 1114, when the distributed storage system is operating in periodic replication mode, the coordinator node can, as part of the interval indication (e.g., part of the data field), or in a separate message, also send an indication of each period and/or period completions, to the nodes. For example, the coordinator node can send period indicators indicating the current period. The coordinator node can also send period change indicators indicating that the next period has started.

In element 1116, the coordinator node determines whether acknowledgements (of receiving the previous interval indication of element 1114) are received from substantially all nodes, including the delinquent node(s). In one embodiment, the coordinator node determines whether acknowledgements are received from all nodes in the distributed storage system. In another embodiment, the coordinator node determines whether acknowledgements are received only from an expected subset of nodes in the distributed storage system. The coordinator node can determine which nodes are expected to provide to answer with the acknowledgements. If acknowledgements are received from all of the expected nodes (i.e., either all nodes or the expected subset of nodes, and including the delinquent node(s)) in the distributed I/O system, method 1100 executes element 1102. If acknowledgements are not received from all of the expected nodes in the distributed I/O system, method 1100 executes element 1114 again. The coordinator node can also communicate with the other nodes with information indicating that the delinquent node(s) can process I/O writes. In one embodiment, since any delinquent node(s) might not have received earlier messages, the coordinator node keeps sending new messages to the delinquent node(s) that indicate that these the delinquent node(s) need special processing.

In one embodiment, once the delinquent node starts to receive the interval indications from the coordinator, the delinquent node will take corrective action before acknowledging these interval indications. If this corrective action process is long, it may be few more intervals before the delinquent node is able to acknowledge the interval indications. Once the delinquent node acknowledges the interval indications, this node can be considered to be a node with good standing. In another embodiment, the delinquent node can acknowledge to the coordinator node that it in the corrective action process, and do the corrective action processing in background. In one embodiment, as described above with reference to FIG. 7, this corrective action process includes the delinquent node can associating any outstanding and in-progress I/O writes as belonging to a new interval received from the coordinator node.

Figure 12:
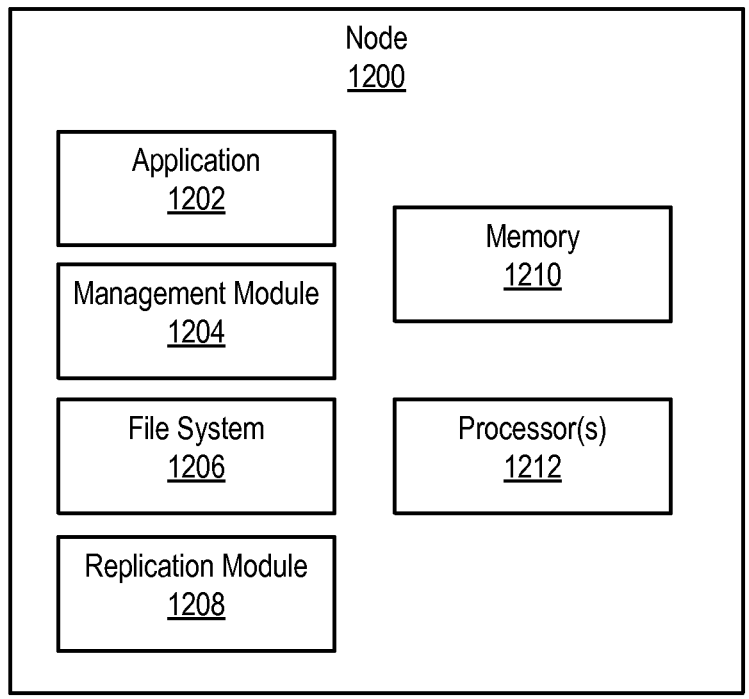
FIG. 12 is a block diagram illustrating various components of a node, according to one embodiment.

FIG. 12 is a block diagram of a node 1200, such as node 102(1)-102(n) described in FIG. 1. Node 1200 includes an application 1202, a management module 1204, a file system 1206, memory 1210, and/or one or more processor(s) 1212. It is noted that is some embodiments, one or more of these elements may be combined. For example, memory 1210 may include one or more of application 1202, management module 1204, and/or file system 1206. It is also noted that management module 1204 may be implemented as a software and/or hardware module. It is also noted that in some embodiments one or more of elements of node 1200 may not be used. Processor(s) 1212 can execute one or more of application 1202, management module 1204, and/or file system 1206. Management module 1204 can implement management module(s) 108(1)-108(n) of FIG. 1. Management module 1204 can implement at least portions of methods 200 and/or 250.

Figure 13:
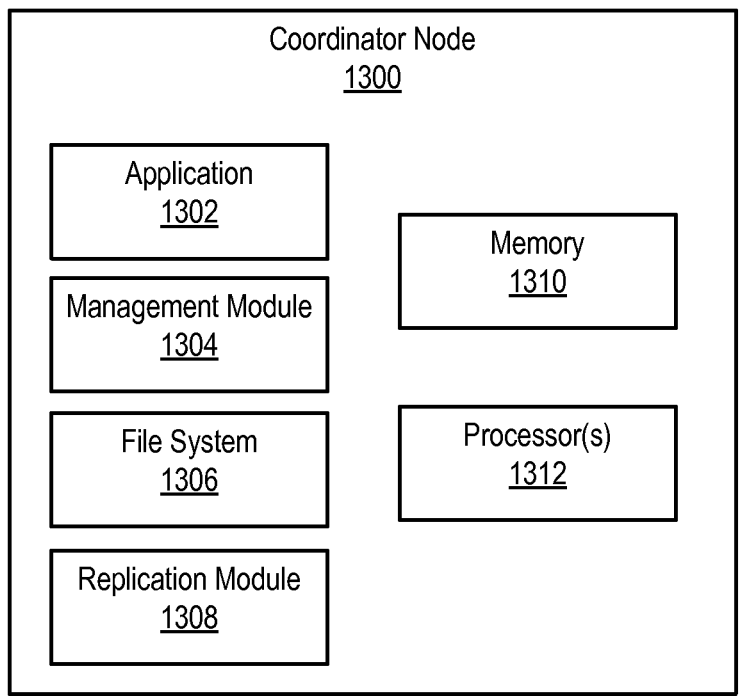
FIG. 13 is a block diagram illustrating various components of a coordinator node, according to one embodiment.

FIG. 13 is a block diagram of a coordinator node 1300, such as coordinator node 104 described in FIG. 1. Coordinator node 1300 includes an application 1302, a management module 1304, a file system 1306, memory 1310, and/or one or more processor(s) 1312. It is noted that is some embodiments, one or more of these elements may be combined. For example, memory 1310 may include one or more of application 1302, management module 1304, and/or file system 1306. It is also noted that management module 1304 may be implemented as a software and/or hardware module. It is also noted that in some embodiments one or more of elements of node 1300 may not be used. Processor(s) 1312 can execute one or more of application 1302, management module 1304, and/or file system 1306. Management module 1304 can implement management module(s) 110(1) of FIG. 1. Management module 1304 can implement at least portions of methods 300 and/or 1100.

Figure 14:
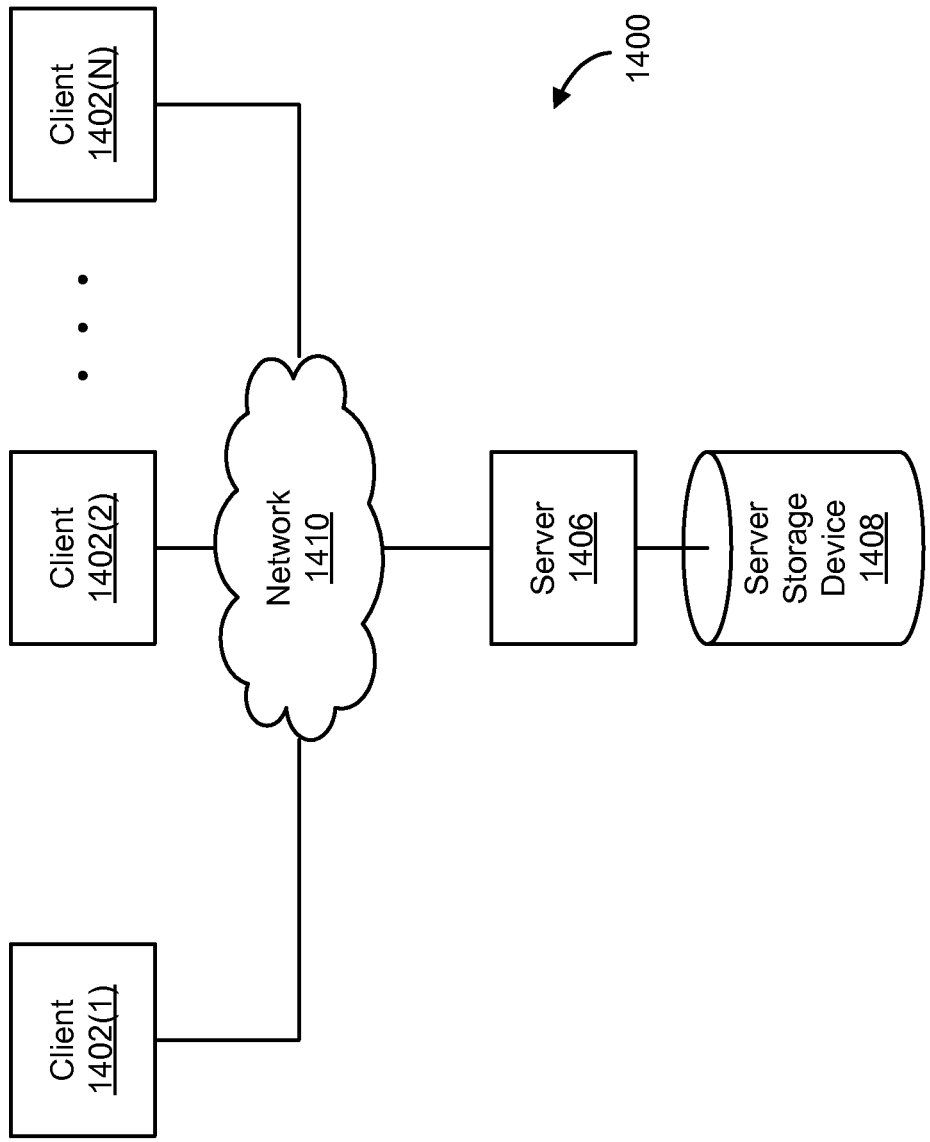
FIG. 14 is a block diagram illustrating a network architecture in which embodiments of the present application can be implemented.

Elements of network architecture can be implemented using different computer systems and networks. An example of one such network environment is described below with reference to FIG. 14. FIG. 14 is a simplified block diagram illustrating a network architecture 1400 in which one or more clients are provided with access to a server via various network connections. As depicted in FIG. 14, clients 1402(1)-(N) are coupled to a network 1410, and so are able to access a server 1406 (which can be used to implement node(s) of FIGS. 1, 12 and/or 13) via network 1410. Other servers (not shown) can be used instead to implement system(s) node(s) of FIGS. 1, 12, and/or 13). A client can be implemented using, for example, a desktop computer, a laptop computer, a workstation, a server, a cell phone, a smart phone, a network-enabled personal digital assistant (PDA), or the like. An example of network 1410, which can be used by clients 1402(1)-(N) to access server 1406, is the Internet. Alternatively, access to server 1406 can be provided by a local area network (LAN) utilizing Ethernet, IEEE 802.11x, or some other communications protocol. As will be appreciated, server 1406 can be accessed by clients coupled directly thereto (not shown).

As also depicted on FIG. 14, server 1406 is coupled to a server storage device 1408, which includes a data volume such as primary storage 112 and/or secondary storage 114. Server storage device 1408 can be implemented as a single storage device or a collection of storage devices. Server storage device 1408 can also be implemented as a storage area network, which couples remote storage devices to a server (e.g., server 1406), such that the remote storage devices appear as locally-attached storage devices to the server's OS, for example.

In light of the present disclosure, those of skill in the art will appreciate that server storage device 1408 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1400 can include other components such as routers, firewalls and the like that are not germane to the discussion of the present network and will not be discussed further herein. Those of skill in the art will also appreciate that other configurations are possible. For example, clients 1402(1)-(N) can be directly coupled to server storage device 1408 without the user of a server or Internet; server 1406 can be used to implement both the clients and the server; network architecture 1400 can be implemented without the use of clients 1402(1)-(N); and so on.

As an example implementation of network architecture 1400, server 1406, services requests to data generated by clients 1402(1)-(N) to data stored in server storage device 1408. Any of the functionality of the nodes, agents, and/or administration modules can be implemented using one of the other servers in the manner illustrated by FIGS. 1, 12, and/or 13.

Figure 15:
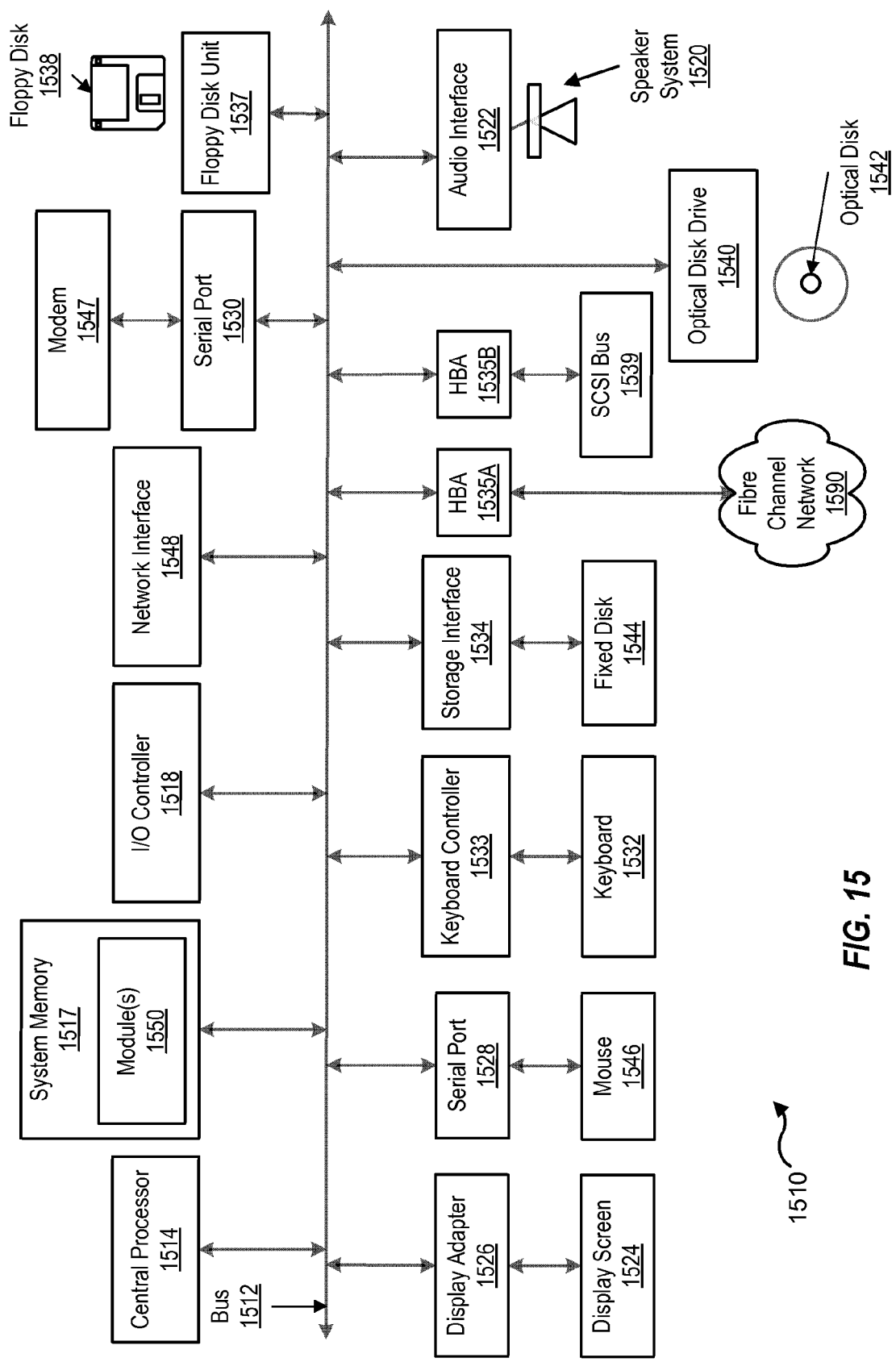
FIG. 15 is a block diagram that illustrates an example of a computer system suitable for implementing embodiments of the present application.

FIG. 15 depicts a block diagram of a computer system 1510 suitable for implementing the present disclosure. Computer system 1510 may be illustrative of various computer systems in the networked system of FIG. 1, such as node(s) and/or coordinator node(s), among others. Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1510 are generally stored on and accessed via a computer readable medium, such as a hard disk drive (e.g., fixed disk 1544), an optical drive (e.g., optical drive 1540), a floppy disk unit 1537, or other storage medium. Additionally, applications can be in the form of electronic signals modulated in accordance with the application and data communication technology when accessed via network modem 1547 or interface 1548.

Storage interface 1534, as with the other storage interfaces of computer system 1510, can connect to a standard computer readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 15 need not be present to practice the present disclosure. The devices and subsystems can be interconnected in different ways from that shown in FIG. 15. The operation of a computer system such as that shown in FIG. 15 is readily known in the art and is not discussed in detail in this application. Code for the automatically performing operations on such applications based on their dependencies on other applications (such as described above with reference to the methods of FIGS. 2A-2D, 3, and 11), etc., to implement the present disclosure can be stored in computer-readable storage media such as one or more of system memory 1517, fixed disk 1544, optical disk 1542, or floppy disk 1538. Memory 1520 is also used for storing temporary variables or other intermediate information during the execution of instructions by the processor 1510. The operating system provided on computer system 1510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
receiving, at a local node,
a first write from an application, and
a first interval indication, wherein
the first interval indication indicates a start of a first interval, and
the first interval indication is one of a plurality of interval indications;
first initiating, at the local node, a first local write, a first remote write, and a second remote write, wherein
the first initiating is performed in response to receipt of the first interval indication,
the first local write accesses a local storage of the local node,
the first local write is based on the first write,
the first remote write accesses a first remote storage,
the first remote write replicates the first local write,
the second remote write accesses a second remote storage, and
the second remote write replicates the first local write;
receiving, at the local node, a first remote write acknowledgement, wherein
the first remote write acknowledgement indicates that the first remote storage completed the first remote write;
receiving, at the local node, a second remote write acknowledgement, wherein
the second remote write acknowledgement indicates that the second remote storage completed the second remote write;
receiving a second interval indication of the plurality of interval indications; and
acknowledging a completion of the first remote write and a completion of the second remote write, wherein
the acknowledging of each completion is communicated to the application, and
the acknowledging is performed in response to receipt of the first remote write acknowledgement, the second remote write acknowledgement, and the second interval indication.

2. The method of claim 1, wherein
a plurality of nodes comprises a first node, and
the first node performs the acknowledging in response to determining that each of the plurality of nodes have received the second interval indication.

3. The method of claim 2, wherein
determining that each of the plurality of nodes have received the second interval indication comprises
receiving an acknowledgement that each of the plurality of nodes has received the second interval indication.

4. The method of claim 1, wherein
the first remote write has a first associated time stamp, and
the first associated time stamp indicates the first interval.

5. The method of claim 1, further comprising:
determining a new interval if the first local write and the first remote write have completed before receiving the second interval indication.

6. The method of claim 1, further comprising:
sending a first interval acknowledgement, wherein
the first interval acknowledgement indicates receipt of the first interval indication.

7. The method of claim 1, wherein
the first initiating is performed further in response to the receiving the first write, and
the first write accesses a first data;
and further comprising:
receiving a second write from the application, wherein
the application is configured to issue the second write in response to the acknowledging,
the second write accesses a second data, and
the second data is dependent on the first data.

8. The method of claim 1, wherein
the first remote write accesses a first data,
the second remote write accesses a second data, and
the second data is dependent on the first data.

9. The method of claim 1, further comprising:
second initiating a third local write to the local storage and a third remote write to a third remote storage, wherein
the third remote write replicates the third local write,
the second initiating is performed in response to receipt of the first interval indication,
the first remote write accesses a first data,
the third remote write accesses a second data, and
the second data is independent of the first data.

10. The method of claim 1, further comprising:
determining if a first node has not responded to a first amount of the plurality of interval indications;
in response to a determination that the first node has not responded to the first amount of the plurality of interval indications, indicating in interval indications that the first node is unresponsive.

11. The method of claim 10, further comprising:
determining if the first node responds to interval indications after a delay, and
in response to a determination that the first node responds to the interval indications, processing any remote writes performed by the first node during the delay.

12. The method of claim 1, further comprising:
determining whether a first node is accessing certain data, wherein the certain data comprises a first data dependency characteristic;
in response to a determination that the first node is accessing the certain data, the first node performing batch processing of the certain data.

13. The method of claim 1, wherein
in response to receiving the acknowledging of the completion, the application is configured to complete a first application write, wherein
the first write is based on the first application write, and
the application is configured to complete the first application write during a second interval.

14. A system comprising:
an application, wherein
the application is configured to issue a first write,
a management module, wherein
the management module is configured to
receive, at a local node, a first interval indication, wherein
the first interval indication indicates a start of a first interval,
initiate, at the local node, a first local write, a first remote write, and a second remote write, wherein
the first local write is based on the first write,
the management module performs the initiating in response to
the application issuing the first write, and
the management module receiving the first interval indication,
the first remote write accesses a first remote storage, and the second remote write access a second remote storage, receive, at the local node, a second interval indication, wherein the second interval indication indicates a start of a second interval, receive, at the local node, a first remote write acknowledgement, wherein the first remote write acknowledgement indicates that the first remote storage completed the first remote write, receive, at the local node, a second remote write acknowledgement, wherein the second remote write acknowledgement indicates that the second remote storage complete the second remote write:

and acknowledge that the first remote write and the second remote write are completed, wherein the management module performs the acknowledging of the first write and the acknowledging of the second write in response to receiving the second interval indication, receiving the first remote write acknowledgement, and receiving the second remote write acknowledgement; and the management module performs the acknowledging to the application.

15. The system of claim 14, wherein
the application is configured to issue to a second write in response to receiving acknowledgement of the first write from the management module.

16. The system of claim 14, wherein
a plurality of nodes comprises the system,
the management module performs the acknowledging of the first write in further response to
determining that each of the plurality of nodes have received the second interval indication.

17. The system of claim 14, wherein
the management module is further configured to send a first interval acknowledgement, wherein
the first interval acknowledgement indicates that the management module received the first interval indication.

18. A computer program product comprising:
a plurality of instructions, comprising
a first set of instructions, executable on a computer system, configured to receive a first interval indication, wherein
the first interval indication indicates a start of a first interval,
the first interval indication is one of a plurality of interval indications, a second set of instructions, executable on the computer system, configured to initiate a first local write, a first remote write, and a second remote write, wherein
the first local write is based on a first write,
the first write is received from an application,
the initiating is performed in response to receipt of the first interval indication,
the first local write accesses a local storage,
the first remote write accesses a first remote storage,
the first remote write replicates the first local write,
the second remote write accesses a second remote storage, and
the second remote write replicates the first local write, a third set of instructions, executable on the computer system, configured to receive a first remote write acknowledgement, wherein
the first remote write acknowledgement indicates that the first remote storage completed the first remote write, a fourth set of instructions, executable on the computer system, configured to receive a second remote write acknowledgement, wherein
the second remote write acknowledgement indicates that the second remote storage completed the second remote write, a fifth set of instructions, executable on the computer system, configured to
receive a second interval indication of the plurality of interval indications, and a sixth set of instructions, executable on the computer system, configured to acknowledge that the first remote write and the second remote write have completed in response to receipt of the first remote write acknowledgement, the second remote write acknowledgement, and the second interval indication, wherein
the acknowledgement of the completion is communicated to the application; and a computer-readable storage medium, wherein the instructions are encoded in the computer-readable storage medium.

19. The computer program product of claim 18, wherein
each of the first remote write and the first local write has a first associated time stamp, and
the first associated time stamp indicates the first interval.

20. The computer program product of claim 18, wherein
determining that each of a plurality of nodes have received the second interval indication comprises
receiving an acknowledgement that each of the plurality of nodes have received the second interval indication.

21. The computer program product of claim 18, wherein
the plurality of instructions further comprises a seventh set of instructions, executable on a computer system, configured to
send a first interval acknowledgement, wherein
the first interval acknowledgement indicates receipt of the first interval indication.

* * * * *